United States Patent
Hashi et al.

(10) Patent No.: US 8,351,142 B2
(45) Date of Patent: Jan. 8, 2013

(54) DRIVE UNIT

(75) Inventors: Hideyuki Hashi, Osaka (JP); Akira Koga, Osaka (JP); Hideaki Mukae, Hyogo (JP); Eiichi Nagaoka, Hyogo (JP)

(73) Assignee: Panasonic Corporation, Osaka (JP)

( * ) Notice: Subject to any disclaimer, the term of this patent is extended or adjusted under 35 U.S.C. 154(b) by 19 days.

(21) Appl. No.: 13/086,573

(22) Filed: Apr. 14, 2011

(65) Prior Publication Data

US 2011/0255185 A1 Oct. 20, 2011

(30) Foreign Application Priority Data

Apr. 15, 2010 (JP) .................. 2010-093886

(51) Int. Cl.
*G02B 7/02* (2006.01)

(52) U.S. Cl. ........................ 359/824; 359/823

(58) Field of Classification Search ............... 359/824
See application file for complete search history.

(56) References Cited

U.S. PATENT DOCUMENTS

2006/0043824 A1 3/2006 Sakano et al.
2011/0241487 A1* 10/2011 Mukae et al. ............ 310/323.02

FOREIGN PATENT DOCUMENTS

JP 2006-067712 3/2006

* cited by examiner

*Primary Examiner* — James Jones
(74) *Attorney, Agent, or Firm* — Renner, Otto, Boisselle & Sklar, LLP

(57) ABSTRACT

A drive unit includes a lens frame configured to support a lens, a movable body located outside the lens and configured to be movable with the lens frame, and a vibratory actuator configured to drive the movable body. The vibratory actuator includes an actuator main body contacting the movable body, an opposite member provided at a position which is opposite to the actuator main body so that the movable body is sandwiched between the actuator main body and the opposite member, and a connecting member configured to connect the actuator main body and the opposite member and to bias them toward the movable body. The connecting member is not provided at a side of the movable body where the lens frame is provided, but is provided at an opposite side of the movable body to the side where the lens frame is provided, as viewed in the optical direction.

6 Claims, 28 Drawing Sheets

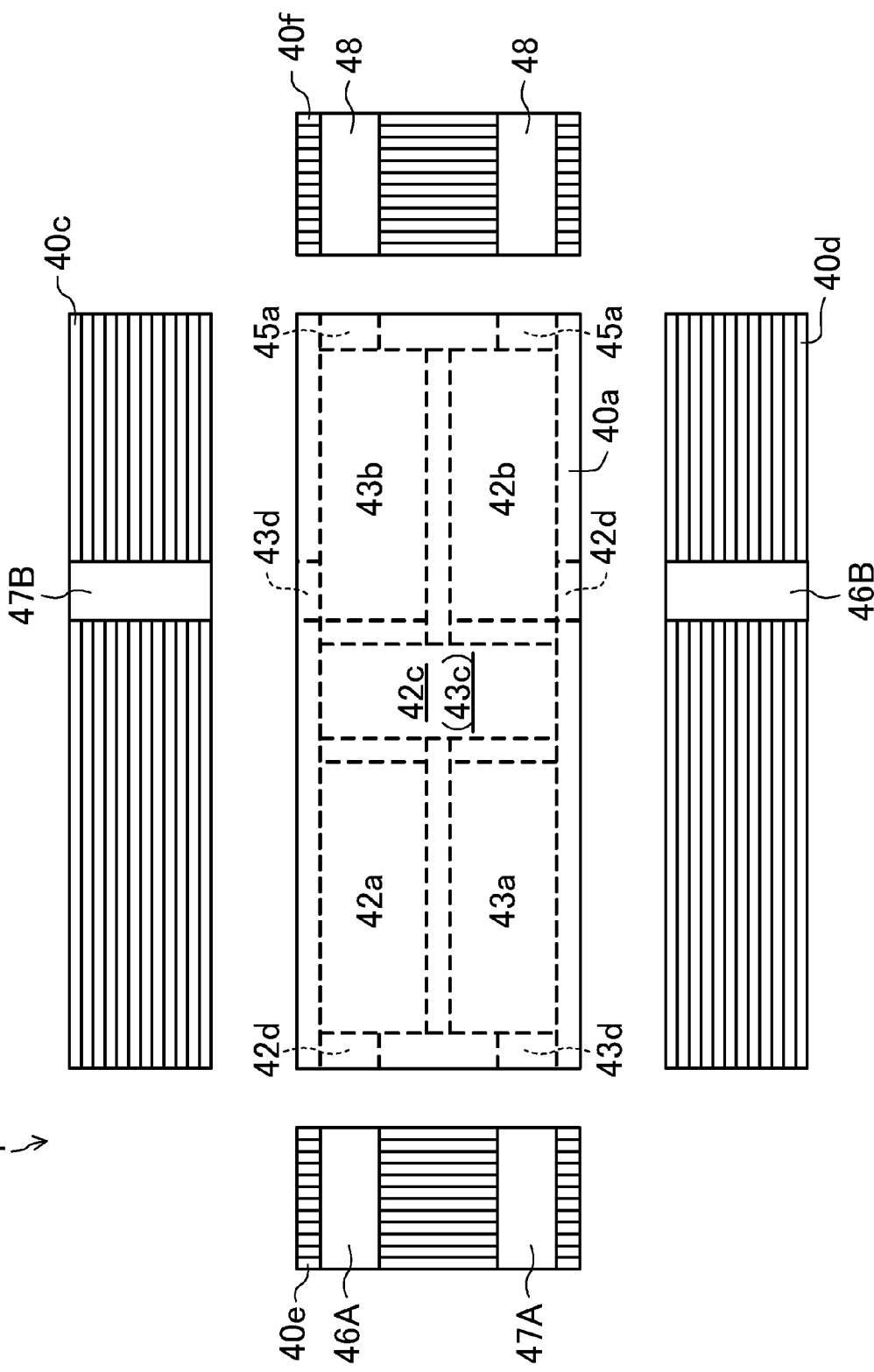

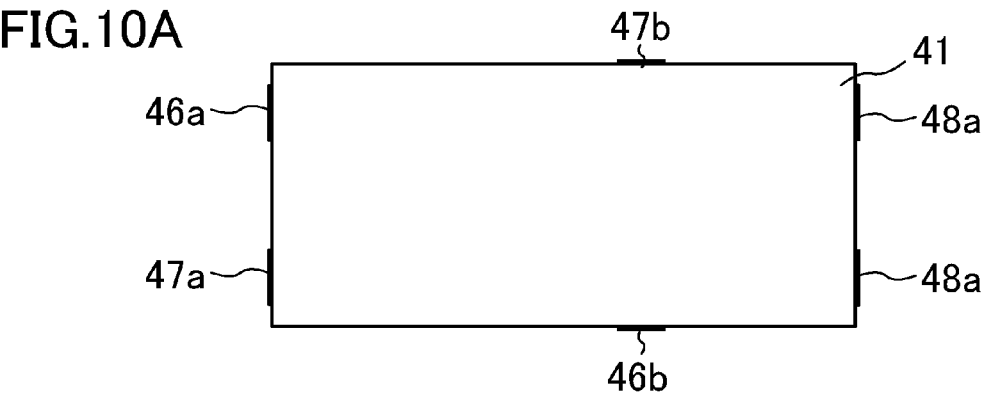
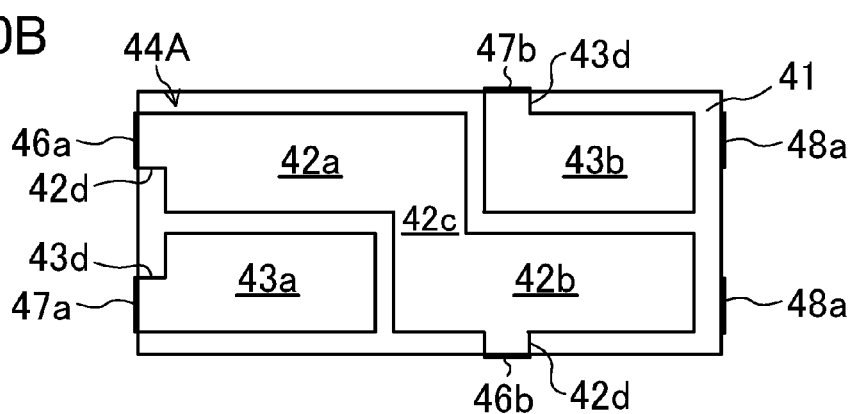
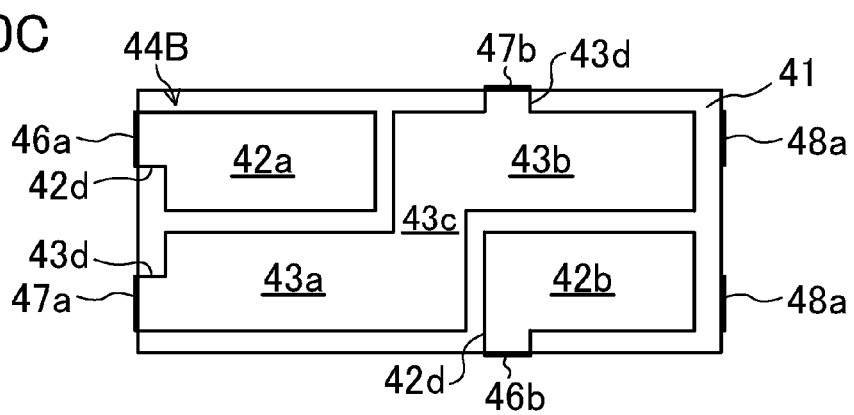
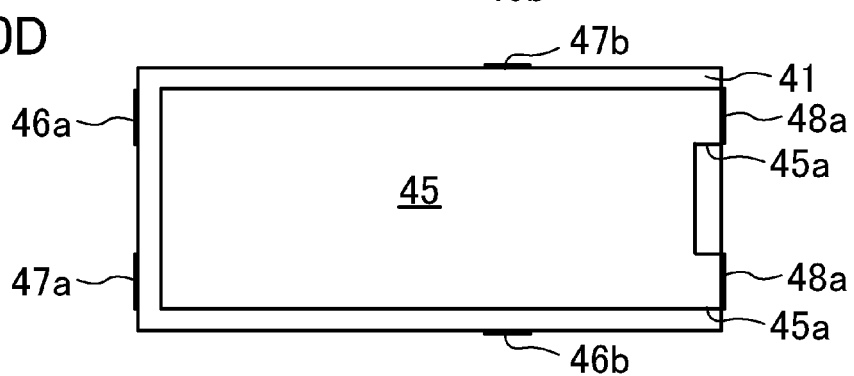

DRIVE UNIT

CROSS-REFERENCE TO RELATED APPLICATION

This application claims priority to Japanese Patent Application No. 2010-093886 filed on Apr. 15, 2010, the disclosure of which including the specification, the drawings, and the claims is hereby incorporated by reference in its entirety.

BACKGROUND

The present disclosure relates to a drive unit which includes a vibratory actuator and drives a lens frame.

Conventionally, as a drive unit for driving a lens frame, various drive units have been known. For example, a drive unit according to Japanese Patent Publication No. 2006-067712 (hereinafter referred to as PATENT DOCUMENT 1) includes a vibratory actuator with two actuator bodies each of which is comprised of a piezoelectric element. Specifically, the two actuator bodies are arranged so that a shaft is sandwiched therebetween. The vibratory actuator further includes two engaging members between which the two actuator bodies arranged as described above are sandwiched. The two engaging members are connected together via a housing and are biased by two coil springs in the direction toward the two actuator bodies. That is, the two actuator bodies press on the shaft from both sides. The vibratory actuator configured as described above has a substantially rectangular-parallelepiped shape formed by the actuator bodies and the engaging members. The shaft sticks out from one end portion of the vibratory actuator in the longitudinal direction of the vibratory actuator. When the two actuator bodies are vibrated in this state, drive force of the actuator bodies is transmitted to the shaft, and the shaft is driven in the axis direction of the shaft. An end of the shaft is connected to a lens frame. Specifically, a pin is provided at the end of the shaft to extend in the radial direction of the shaft. A long hole is provided in the lens frame to extend in parallel to the shaft. The pin provided at the end of the shaft fits in the long hold of the lens frame. The pin fitting in the long hole is substantially fixed by a plate spring. Thus, displacement of the shaft in the axis direction is transmitted to the lens frame.

SUMMARY

In the drive unit of PATENT DOCUMENT 1, the amount of movement of the lens frame is determined by the amount of movement of the pin provided at the end of the shaft. The pin of the drive unit can move between a position where the shaft sticks out from the one end portion of the vibratory actuator in the longitudinal direction of the vibratory actuator to a maximum extent to a position where the shaft is drawn to a minimum extent. The total amount of movement of the pin is the total amount of movement (total drive amount) of the vibratory actuator. In the above-described configuration, the pin can only move outside the one end portion of the vibratory actuator in the longitudinal direction of the vibratory actuator.

When the drive unit is arranged inside of a lens barrel, etc., it is necessary to ensure a space in which the vibratory actuator can be arranged therein. However, since the pin can only move outside the end portion of the vibratory actuator in the longitudinal direction of the vibratory actuator, the space is only used for arrangement of the vibratory actuator, and cannot be used for movement of the pin. That is, assuming that the total necessary amount of movement of the lens frame is determined, because the total amount of movement has to be ensured and an enough space in which the vibratory actuator is to be arranged is necessary, the size of the lens barrel is increased. On the other hand, assuming that the size of the lens barrel is restricted, because an enough space in which the vibratory actuator is to be arranged is necessary, the total amount of movement of the lens frame has to be reduced.

The present disclosure has been made in view of the foregoing, and it is therefore an objective thereof to reduce the size of a drive unit and ensure the total amount of movement of a lens frame.

A drive unit according to the present disclosure includes a lens frame configured to support a lens, a movable body arranged to be located outside the lens in a radial direction of the lens and extend along an optical axis direction, and configured to be movable with the lens frame as one unit along the optical axis direction, and a vibratory actuator configured to drive the movable body. The vibratory actuator includes an actuator main body arranged to contact the movable body and configured to vibrate to output drive force to the movable body, an opposite member arranged at a position which is opposite to the actuator main body to contact the movable body so that the movable body is sandwiched between the actuator main body and the opposite member, and a connecting member configured to connect the actuator main body and the opposite member together and bias the actuator main body and the opposite member in a direction toward the movable body, and the connecting member is not provided at a side of the movable body at which the lens frame is provided, but is provided at an opposite side of the movable body to the side at which the lens frame is provided, as viewed in the optical direction.

Another drive unit according to the present disclosure includes a lens frame configured to support a lens, a movable body arranged to be located outside the lens in a radial direction of the lens and extend along an optical axis direction, and configured to be movable with the lens frame as one unit along the optical axis direction, and a vibratory actuator configured to drive the movable body. The vibratory actuator includes an actuator main body arranged to contact the movable body and configured to vibrate to output drive force to the movable body, an opposite member arranged at a position which is opposite to the actuator main body to contact the movable body so that the movable body is sandwiched between the actuator main body and the opposite member, and a connecting member configured to connect the actuator main body and the opposite member together and bias the actuator main body and the opposite member in a direction toward the movable body, and the connecting member does not overlap the lens frame, as viewed in the optical direction.

In each of the above-described drive units, when the lens frame moves along an optical axis direction, the lens frame and the connecting member do not interfere with each other, and the lens frame can move along the optical axis direction while passing at the side of the actuator main body. That is, a space provided at the side of the actuator main body can be used for the movement of the lens frame. Therefore, the size of the entire drive unit can be reduced, and the total amount of movement of the lens frame can be ensured.

BRIEF DESCRIPTION OF THE DRAWINGS

FIG. 9 is a developed view of an actuator main body in an orthographic projection.

FIG. 10A is a view of one of principal surfaces of one of outermost piezoelectric layers, as viewed in a stacking direction.

FIG. 10B is a view of one of principal surfaces of one of the piezoelectric layers in which a first power-feeding electrode layer is provided, as viewed in the stacking direction.

FIG. 10C is a view of one of principal surfaces of one of the piezoelectric layers in which a second power-feeding electrode layer is provided, as viewed in the stacking direction.

FIG. 10D is a view of one of principal surfaces of one of the piezoelectric layers in which a common electrode layer is provided, as viewed in the stacking direction.

DETAILED DESCRIPTION

Example embodiments will be described below with reference to the drawings.

Figure 1:
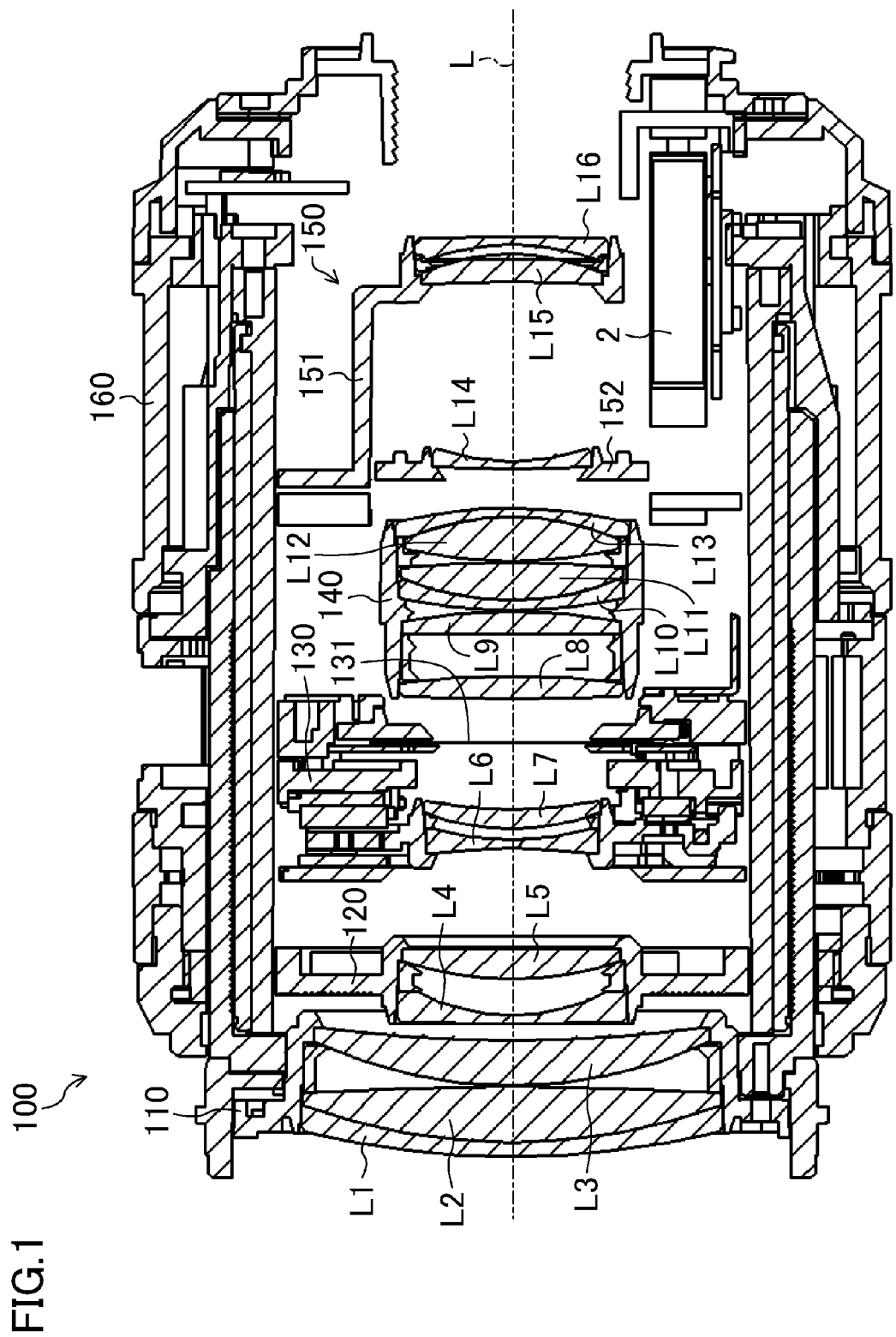
FIG. 1 is a longitudinal-sectional view of an interchangeable lens according to an embodiment taken along a plane including an optical axis.

A drive unit according to an embodiment is incorporated in an interchangeable lens which is removable from a camera body. FIG. 1 is a longitudinal-sectional view of the interchangeable lens taken along a plane including an optical axis. In FIG. 1, the left hand side is an object side, and the right hand side is a camera body (imaging plane) side. An interchangeable lens 100 is attached to a body mount provided in the camera body (not shown) with a lens mount 101 interposed therebetween. As shown in FIG. 1, the interchangeable lens 100 includes sixteen lenses L1-L16. The interchangeable lens 100 also includes first to fifth group frames holding the lenses L1-L16.

Specifically, a first group frame 110 holds first to three lenses L1-L3 forming a first group lens. A second group frame 120 holds fourth and fifth lenses L4 and L5 forming a second group lens. A third group frame 130 holds sixth and seventh lenses L6 and L7 forming a third group lens and an aperture fin 131. A fourth group frame 140 holds eighth to thirteenth lenses L8-L13 forming a fourth group lens. A fifth group frame 150 holds fourteenth to sixteenth lenses L14-L16. More specifically, the fifth group frame 150 includes a frame body 151 and a focus lens frame 152. The frame body 151 holds the fifteenth and sixteenth lenses L15 and L16. The focus lens frame 152 holds the fourteenth lens L14 as a focus lens. The focus lens frame 152 serves as a lens frame.

Each of the first to fourth group frames 110-140 and the frame body 151 of the fifth group frame 150 has a cam mechanism including a cam pin and a cam groove, and is configured to be guided by the cam mechanism and moves in an optical axis L direction, when a zoom ring 160 is rotated.

In this configuration, the focus lens frame 152 of the fifth group frame 150 moves with the frame body 151 as one unit along the optical axis L direction. Note that an ultrasonic actuator 2, which will be described later, is mounted on the focus lens frame 152. That is, the focus lens frame 152 moves with the frame body 151 along the optical axis L direction, as the frame body 151 moves, but the focus lens frame 152 is driven by the ultrasonic actuator 2 to move relative to the frame body 151 in the optical axis L direction.

Figure 2:
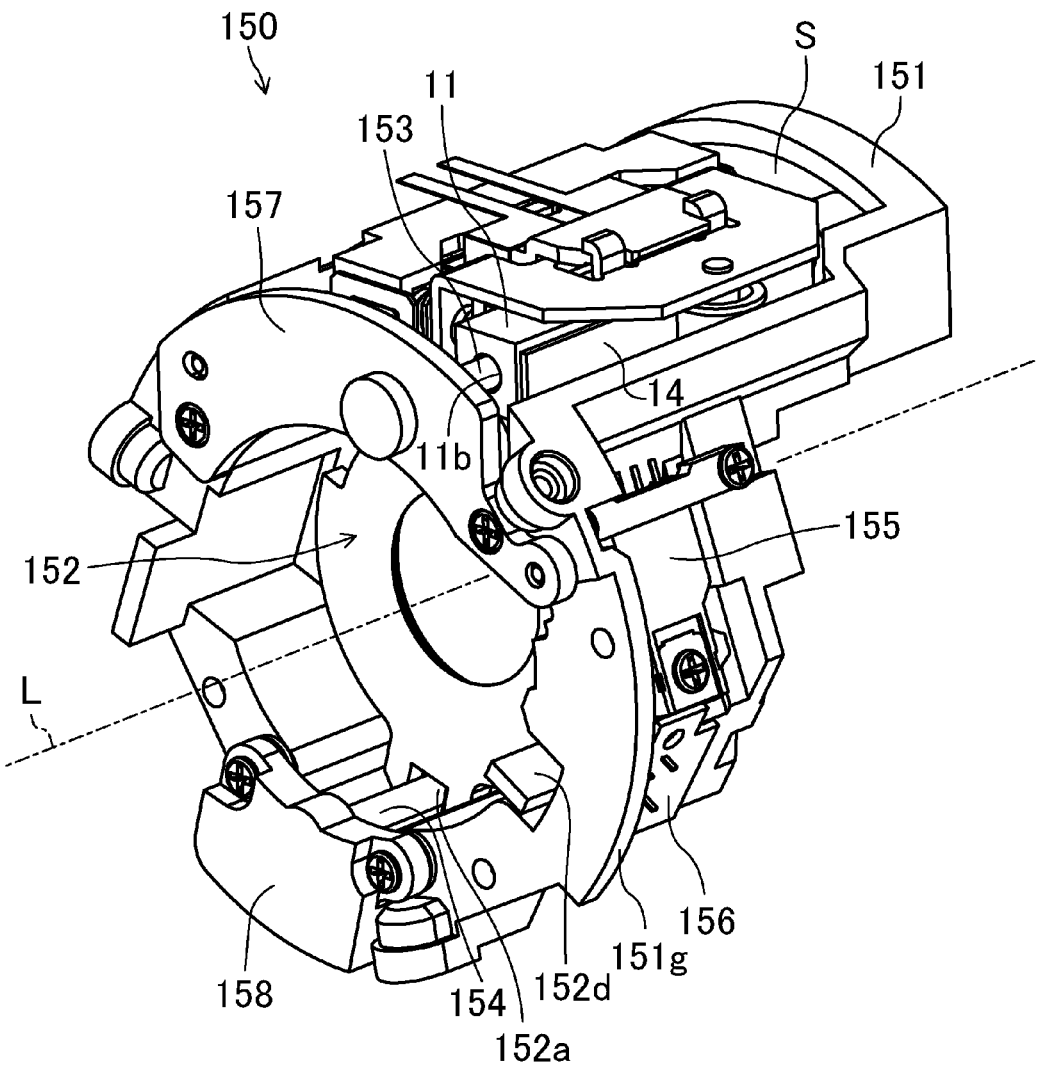
FIG. 2 is a perspective view of a fifth group frame.
Figure 3:
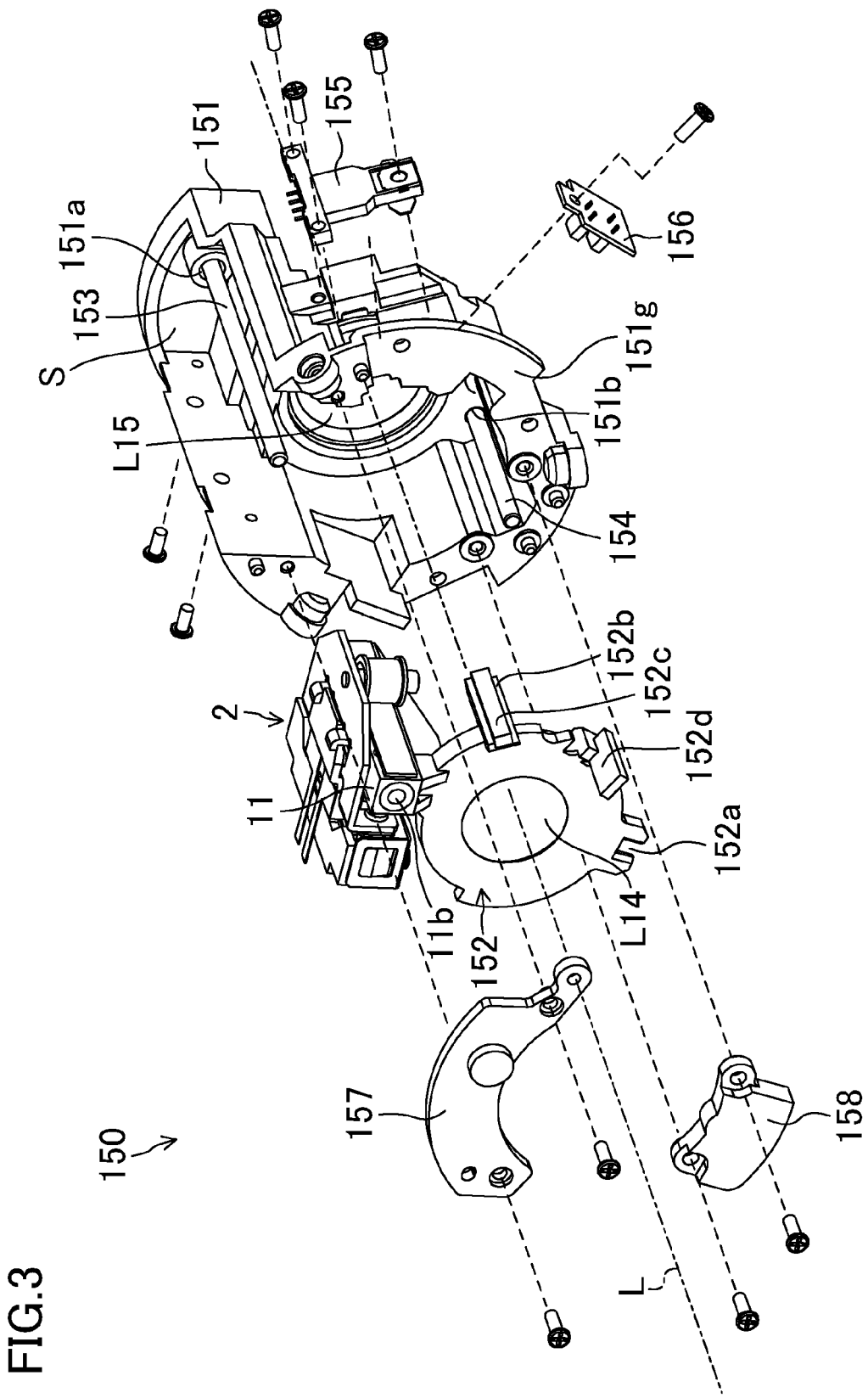
FIG. 3 is an exploded perspective view of the fifth group frame.
Figure 4:
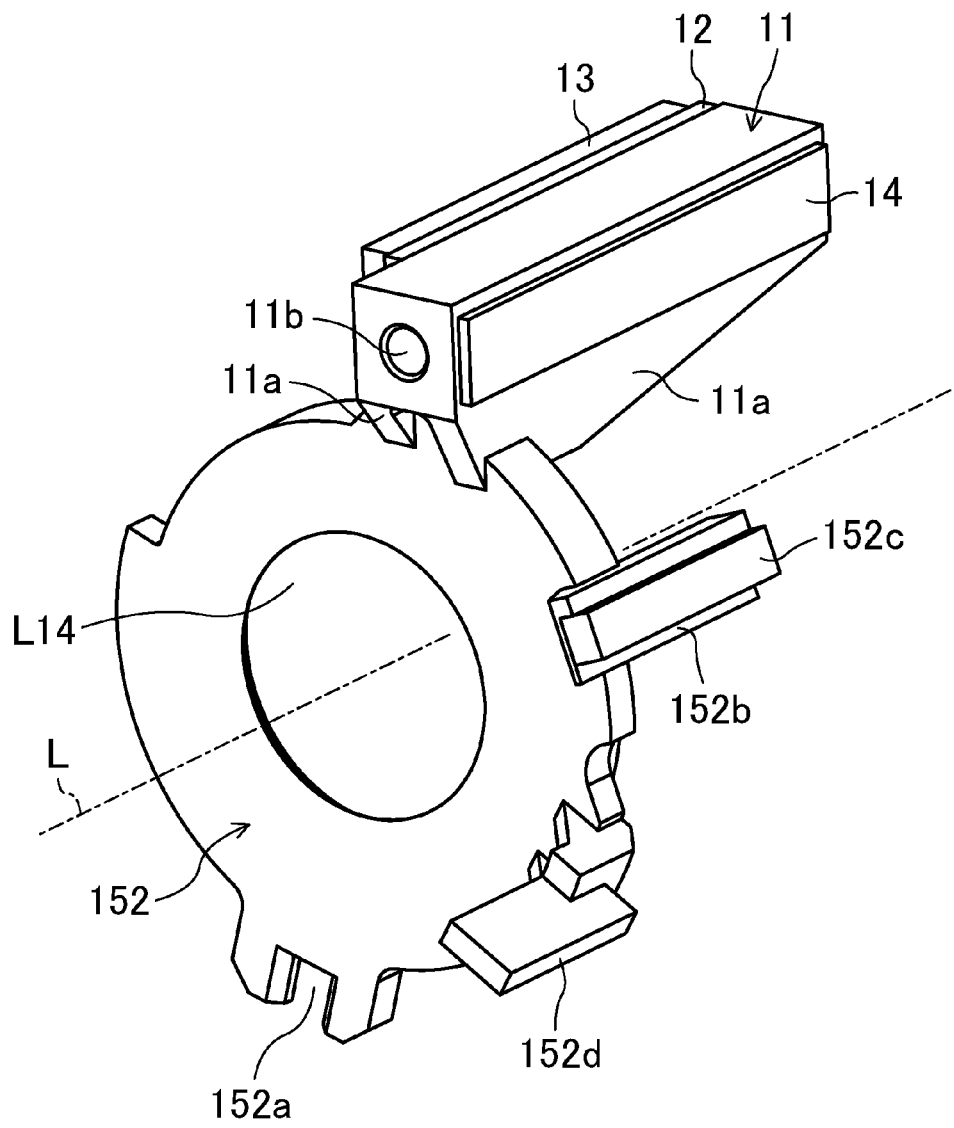
FIG. 4 is a perspective view of a focus lens frame.
Figure 5:
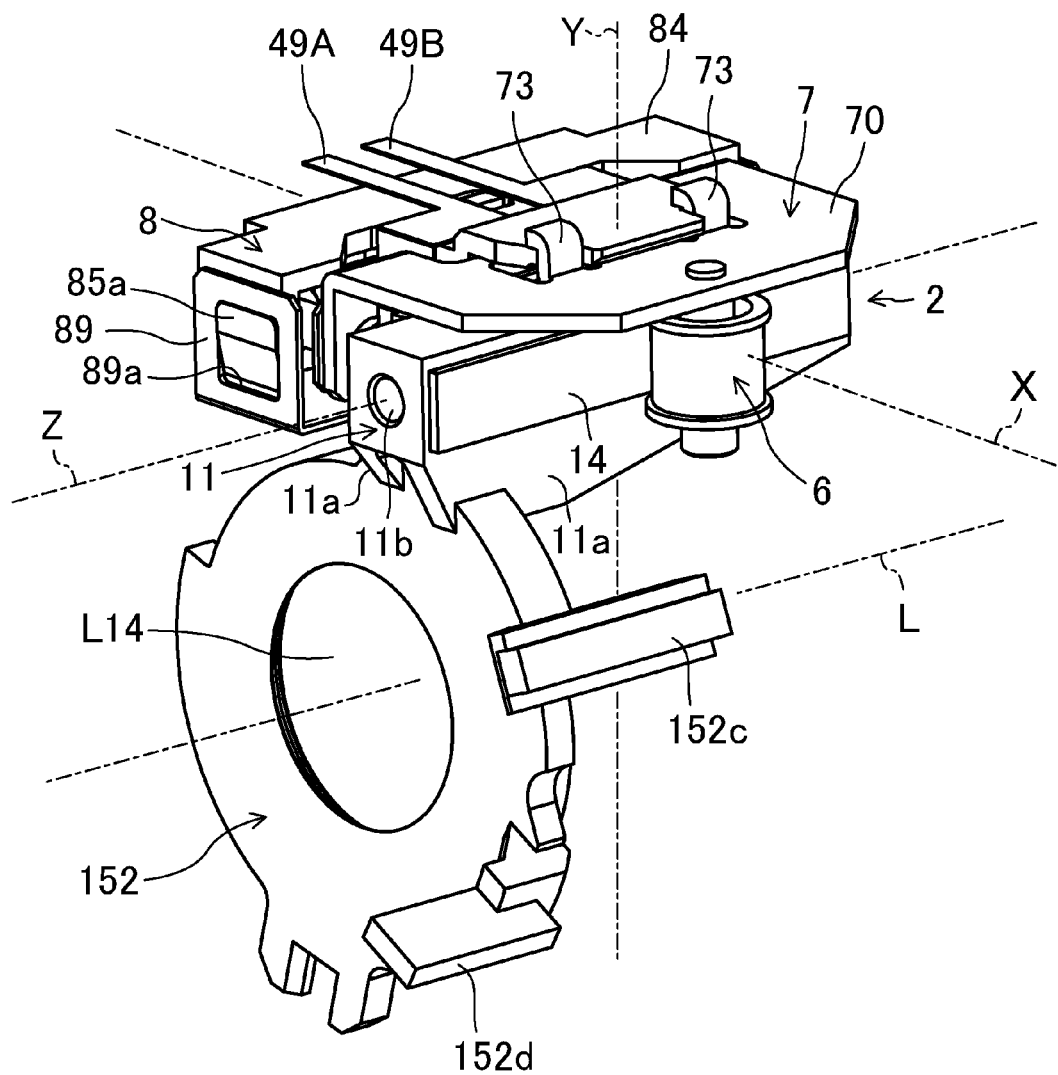
FIG. 5 is a perspective view of a focus lens frame with an ultrasonic actuator attached thereto.

Next, a detail configuration of the fifth group frame 150 will be described with reference to FIGS. 2-5. FIG. 2 is a perspective view of the fifth group frame 150, FIG. 3 is an exploded perspective view of the fifth group frame 150, FIG. 4 is a perspective view of the focus lens frame 152, and FIG. 5 is a perspective view of the focus lens frame 152 with the ultrasonic actuator 2 attached thereto.

The frame body 151 is formed to substantially have a closed-end, cylindrical shape, and an opening is provided at a bottom portion thereof. The fifteenth and sixteenth lenses L15 and L16 are attached to the bottom portion. The frame body 151 has a peripheral wall with a part notched in the optical axis L direction, and a space S in which the ultrasonic actuator 2 is to be arranged is formed in the notched part. In the space S, a focus main shaft 153 extending along the optical axis L direction is provided. A base end portion of the focus main shaft 153 is lightly pressed into an engaging hole 151a of the frame body 151. In the frame body 151, a focus secondary shaft 154 extending along the optical axis L direction is provided substantially at a position opposite to the focus main shaft 153 with the optical axis L interposed therebetween. A base end portion of the focus secondary shaft 154 is lightly pressed into an engaging hole 151b of the frame body 151.

A magnetic resistance (MR) sensor 155 is attached to an outer circumference of the peripheral wall of the frame body 151 with screws. An opening is formed in a part of the peripheral wall of the frame body 151 which faces a sensing section (which detects magnetic force) of the MR sensor 155. The MR sensor 155 is configured to detect, through the opening, a magnet 152c provided in the focus lens frame 152, which will be described later.

Furthermore, a photo interrupter 156 is attached to the outer circumference of the peripheral wall of the frame body 151 with screws. Openings are formed in parts of the peripheral wall of the frame body 151 which respectively correspond a light emitting section and a light receiving section of the photo interrupter 156. The photo interrupter 156 is configured so that the light emitting section and the light receiving section protrude inside the frame body 151 through the openings. The photo interrupter 156 detects passing of a light shield plate 152d attached to the focus lens frame 152 which will be described below.

The focus lens frame 152 is an annular member having an opening at a center thereof, and the fourteenth lens L14 is attached at a center thereof.

A quadrangular prism-shaped movable body 11 extending along the optical L direction is provided on an outer circumference of the focus lens frame 152 (i.e., at a position outside the fourteenth lens L14 in a radial direction of the fourteenth lens L14) to form one unit with the focus lens frame 152. One opposing pair of four side surfaces of the movable body 11 face substantially in a radial direction of the focus lens frame 152, and the other opposing pair of the four surfaces face substantially in a circumferential direction of the focus lens frame 152. The movable body 11 and the focus lens frame 152 are joined via ribs 11a as one unit. Specifically, the ribs 11a are provided on one of the side surfaces of the movable body 11 facing inwardly in the radial direction of the focus lens frame 152. A through hole 11b is formed in the movable body 11 to extend along an axis Z (see FIG. 5) direction which is parallel to the optical axis L. A base plate 12 made of steel is fixedly attached to one of the side surfaces of the movable body 11 facing the circumferential direction of the focus lens frame 152. Furthermore, a sliding member 13 made of alumina is fixedly attached to a surface of the base plate 12. A sliding member 14 made of steel is fixedly attached to the other one of the side surfaces of the movable body 11 facing the circumferential direction of the focus lens frame 152. The ultrasonic actuator 2 is attached to the movable body 11. A configuration of the ultrasonic actuator 2 will be described later. Note that, for simplifying the description, a normal direction of the side surfaces of the movable body 11 facing the circumferential direction (i.e., a normal direction of the sliding members 13 and 14) is referred to as an X axis direction, and a direction perpendicular to the X axis and the Z axis is referred to as a Y axis direction.

A notch 152a is formed to open outwardly in the radial direction in a part of the outer circumference of the focus lens frame 152 which is substantially opposite to the movable body 11 with the optical axis L interposed therebetween.

The focus main shaft 153 is inserted through the through hole 11b of the movable body 11, and the focus secondary shaft 154 is inserted through the notch 152a. In this state, the ultrasonic actuator 2 is secured to the frame body 151 with screws. In this manner, the focus lens frame 152 is attached to the frame body 151. That is, the focus lens frame 152 is attached to the frame body 151 to be movable along the focus main shaft 153 and the focus secondary shaft 154 in the optical axis L direction. In this configuration, the movable body 11 and the notch 152a function as bearings. As described above, the movable body 11 and the notch 152a are provided at positions substantially opposite to each other with the optical axis L interposed therebetween, thereby precisely locating a position of the focus lens frame 152 relative to the frame body 151.

A magnet attachment portion 152b is provided on the outer circumference of the focus lens frame 152, and a magnet 152c is attached to the magnet attachment portion 152b. In a state where the focus lens frame 152 is attached to the frame body 151, the magnet 152c is located at the same position in the circumferential direction around the optical axis L as that of the MR sensor 155 of the frame body 151. That is, the magnet 152c is provided so that, when the focus lens frame 152 moves along the optical axis L direction to reach a predetermined position, the magnet 152c faces the MR sensor 155 through the opening of the frame body 151. A relative position of the focus lens frame 152 in the optical axis L direction can be detected by detecting the magnet 152c with the MR sensor 155.

Furthermore, the light shield plate 152d is provided on the outer circumference of the focus lens frame 152. In the state where the focus lens frame 152 is attached to the frame body 151, the light shield plate 152d is located at the same position in the circumferential direction around the optical axis L as that of the photo interrupter 156 of the frame body 151. That is, the light shield plate 152d is provided so that, when the focus lens frame 152 moves along the optical axis L direction to reach a predetermined position, the light shield plate 152d is located between the light emitting section and the light receiving section of the photo interrupter 156 to shield light entering from the light emitting section to the light receiving section. An absolute position of the focus lens frame 152 in the optical axis L direction can be detected by detecting the light shield plate 152d with the photo interrupter 156.

With the focus lens frame 152 attached to the frame body 151, a main shaft cover 157 and a secondary shaft cover 158 are attached to the frame body 151. A flange 151g is provided on a part of the peripheral wall of the frame body 151 located at an open end of the frame body 151. The open end is located at an opposite side to a bottom portion of the frame body 151. With an end of the focus main shaft 153 attached to the main shaft cover 157, the main shaft cover 157 is secured to the flange 151g with screws. With an end of the focus secondary shaft 154 attached to the secondary shaft cover 158, the secondary shaft cover 158 is secured to the flange 151g with screws. The main shaft cover 157 and the secondary shaft cover 158 prevent the focus lens frame 152 from coming off from the focus main shaft 153 and the focus secondary shaft 154.

Figure 6:
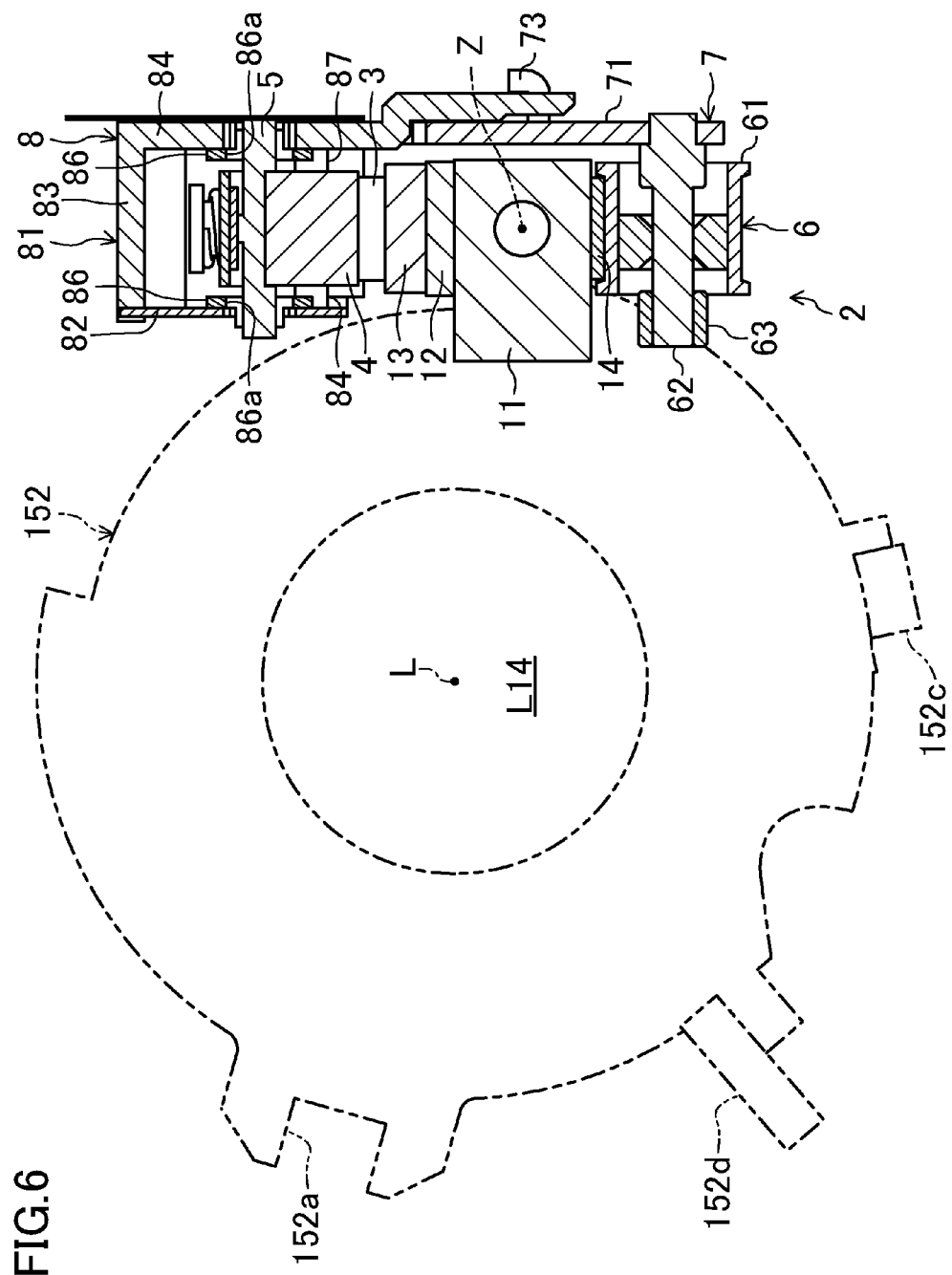
FIG. 6 is a cross-sectional view of an ultrasonic actuator taken along a plane which is orthogonal to a shaft and includes an axis line of a roller.
Figure 7:
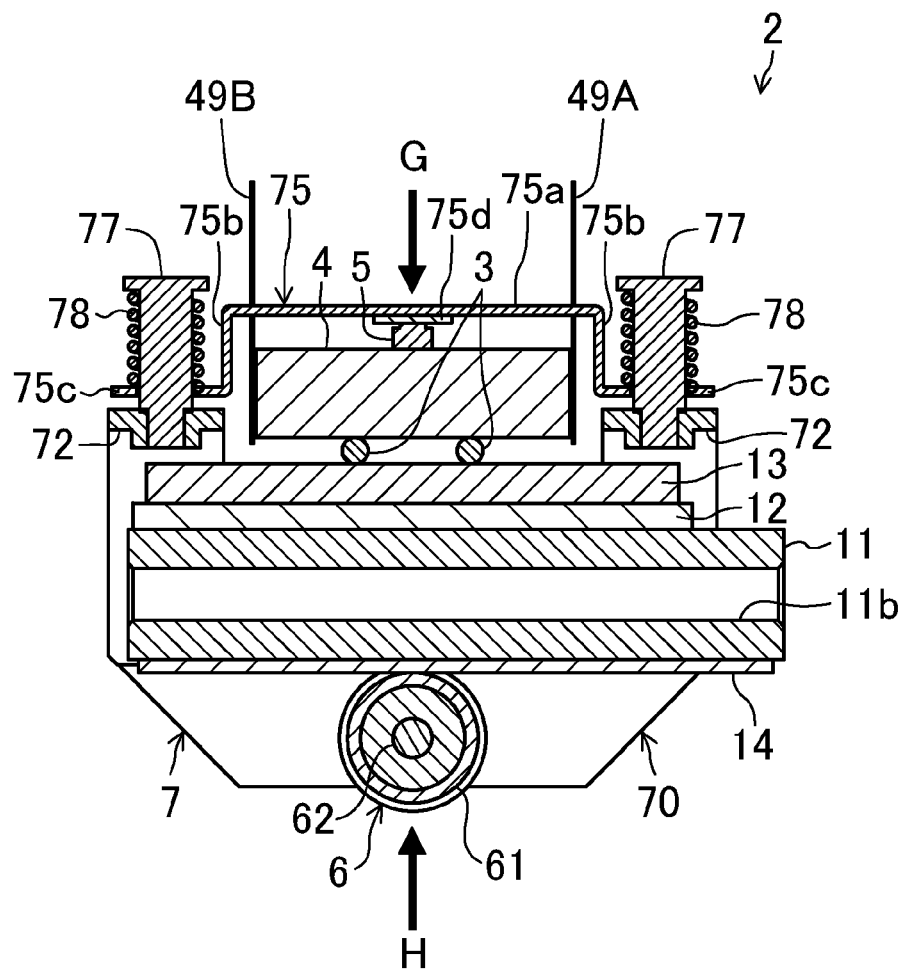
FIG. 7 is a cross-sectional view of an ultrasonic actuator taken along a plane which is orthogonal to the normal direction of principal surfaces of an actuator main body and includes an axis line of the shaft.
Figure 8:
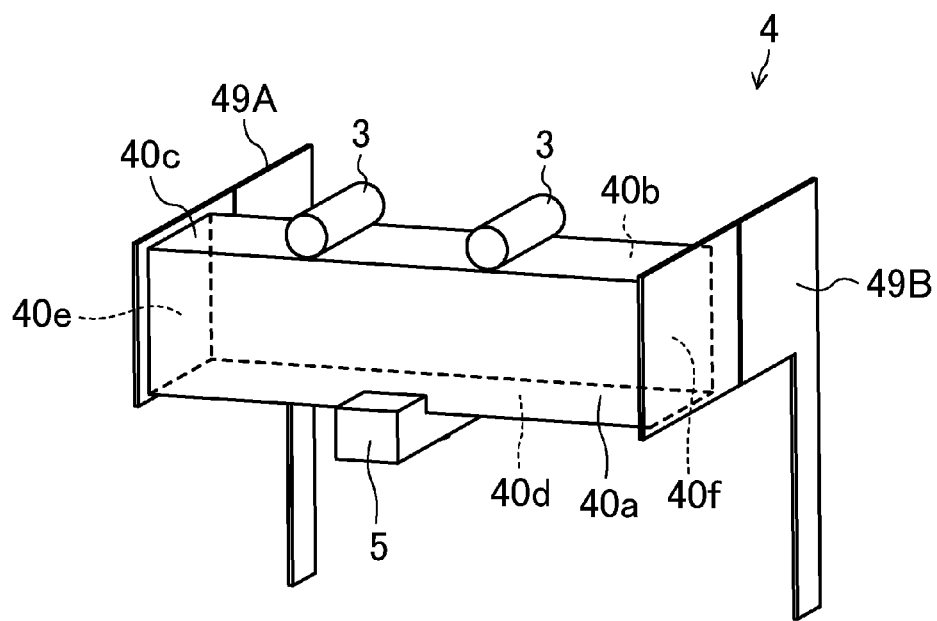
FIG. 8 is a perspective view of an actuator main body.
Figure 11:
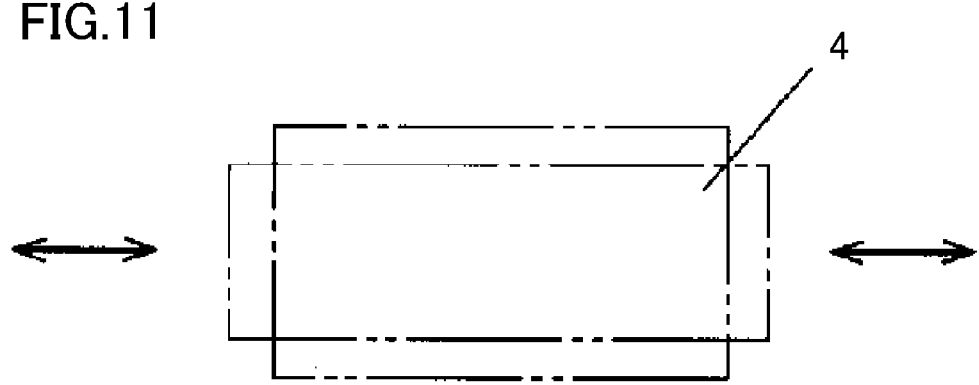
FIG. 11 is a conceptual diagram illustrating the displacement of an actuator main body caused by a first-order mode of longitudinal vibration in the longitudinal direction of the actuator main body.
Figure 12:
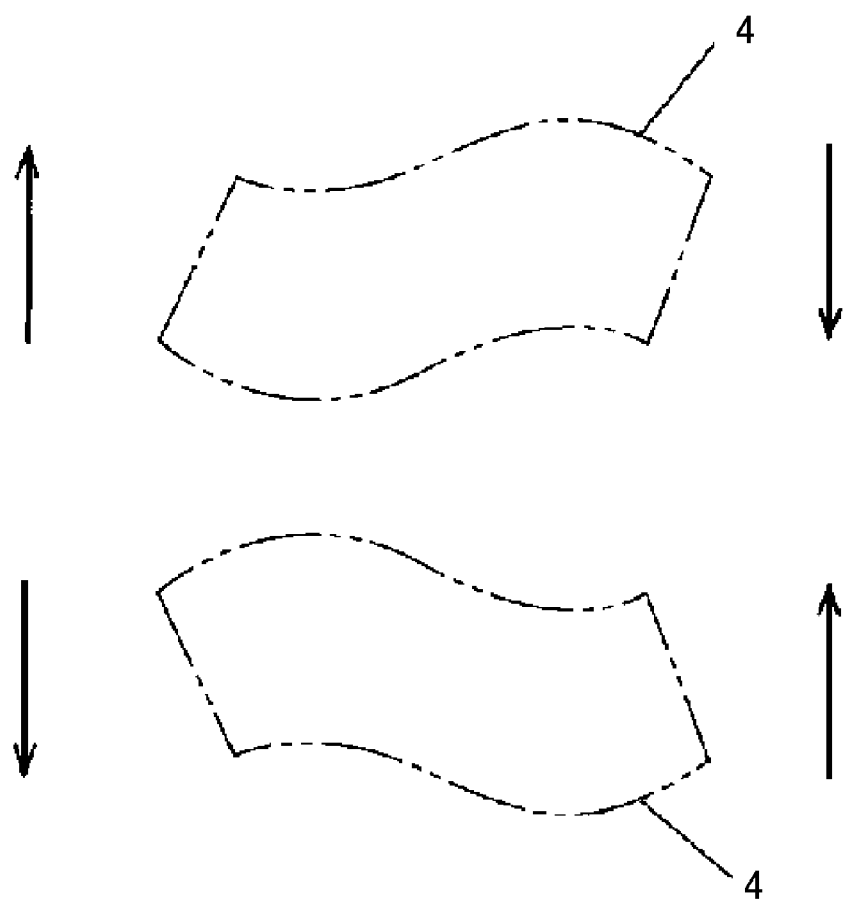
FIG. 12 is a conceptual diagram illustrating the displacement of an actuator main body caused by a second-order mode of bending vibration.
Figure 13A:
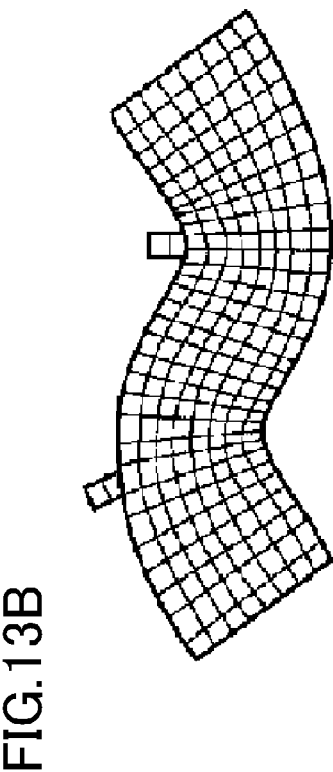
FIGS. 13A-13D are conceptual diagrams illustrating the operation of an actuator main body.
Figure 13B:
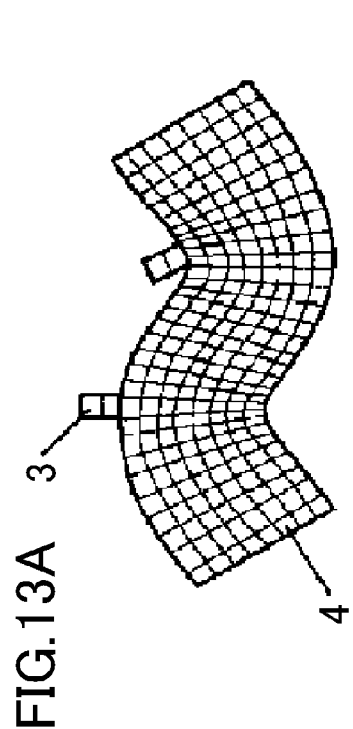
Figure 13C:
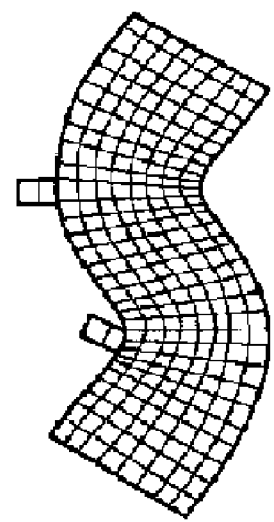
Figure 13D:
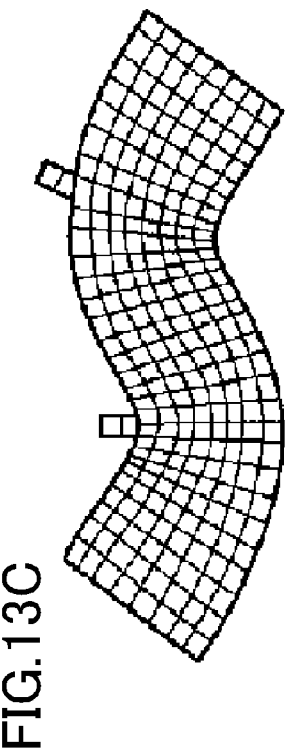

Next, the ultrasonic actuator 2 will be described with reference to FIGS. 6-11. FIG. 6 is a cross-sectional view of the ultrasonic actuator 2 taken along a plane which is orthogonal to a shaft 10 and includes an axis line of a roller 6. FIG. 7 is a cross-sectional view of the ultrasonic actuator 2 taken along a plane which is orthogonal to the normal direction of principal surfaces of an actuator main body 4 and includes an axis line of the shaft 10. FIG. 8 is a perspective view of the actuator main body 4. FIG. 9 is a developed view of the actuator main body 4 in an orthographic projection. FIGS. 10A-10D are respective views of piezoelectric layers each illustrating one of principal surfaces of an associated one of the piezoelectric layers, as viewed in a stacking direction. Specifically, FIG. 10A is a view of one of outermost piezoelectric layers, FIG. 10B is a view of one of the piezoelectric layers in which a first power-feeding electrode layer is provided, FIG. 10C is a view of one of the piezoelectric layers in which a second power-feeding electrode layer is provided, and FIG. 10D is a view of one of the piezoelectric layers in which a common electrode layer is provided. FIG. 11 is a conceptual diagram illustrating the displacement of the actuator main body caused by a first-order mode of longitudinal vibration in the longitudinal direction. FIG. 12 is a conceptual diagram illustrating the displacement of the actuator main body caused by a second-order mode of bending vibration. FIGS. 13A-13D are conceptual diagrams illustrating the operation of the actuator main body.

The ultrasonic actuator 2 includes the actuator main body 4 for producing vibration, a holder 5 for holding the actuator main body 4, the roller 6 for holding the movable body 11 with the actuator main body 4 such that the movable body 11 is sandwiched between the actuator main body 4 and the roller 6, and a connecting member 7 for elastically connecting the actuator main body 4 to the roller 6. With the movable body 11 sandwiched between the actuator main body 4 and the roller 6, the ultrasonic actuator 2 is attached to the frame body 151 via a support body 8. The ultrasonic actuator 2 serves as a vibratory actuator.

The actuator main body 4 is comprised of a piezoelectric element. The actuator main body 4 has a substantially rectangular-parallelepiped shape, which includes a pair of substantially rectangular principal surfaces 40a and 40b facing each other, a pair of long-side surfaces 40c and 40d facing each other and extending in a longitudinal direction of the principal surfaces 40a and 40b to be orthogonal to the principal surfaces 40a and 40b, and a pair of short-side surfaces 40e and 40f facing each other and extending in a lateral direction of the principal surfaces 40a and 40b to be orthogonal to both of the principal surfaces 40a and 40b and the long-side surfaces 40c and 40d. The actuator main body 4 is provided with driver elements 3 for transmitting driving force of the actuator main body 4 to the movable body 11.

As shown in FIGS. 10A-10D, the actuator main body 4 is formed by alternately stacking piezoelectric layers (piezoelectric elements) 41 and internal electrode layers 44A, 45, 44B, and 45. The internal electrode layers 44A, 45, 44B, and 45 are a first power-feeding electrode layer 44A, a common electrode layer 45, a second power-feeding electrode layer 44B, and a common electrode layer 45, which are alternately stacked in this order with the piezoelectric layers 41 being interposed therebetween. The first power-feeding electrode layer 44A, the common electrode layer 45, the second power-feeding electrode layer 44B, and the common electrode layer 45 are grouped as a single set, and a plurality of sets, each of which includes the internal electrode layers 44A, 45, 44B, and 45, are repeatedly stacked with the piezoelectric layers 41 being interposed therebetween. Note that the piezoelectric layers 41 are positioned at both ends of the actuator main body 4 in the stacking direction. Each of the first power-feeding electrode layer 44A, the second power-feeding electrode layer 44B, and the common electrode layers 45 is printed on a principal surface of an associated one of the piezoelectric layers 41. That is, the piezoelectric layers 41 and the electrode layers 44A, 45, 44B, and 45 are alternately stacked by stacking the piezoelectric layers 41 such that the respective principal surfaces of the piezoelectric layers 41 on which the respective electrode layers are printed all face in one direction.

Each of the piezoelectric layers 41 is an insulating layer made of a ceramic material such as lead zirconate titanate. Similar to the actuator main body 4, the piezoelectric layer 41 has a substantially rectangular-parallelepiped shape, which includes a pair of principal surfaces, a pair of long-side surfaces, and a pair of short-side surfaces. The side surfaces of the piezoelectric layer 41 are provided with a plurality of electrodes. Specifically, a second connecting electrode 47b is formed on one of the long-side surfaces. A first connecting electrode 46b is formed on the other one of the long-side surfaces. A first side surface electrode 46a and a second side surface electrode 47a are formed on one of the short-side surfaces to be respectively located at one end portion and the other end portion of the short side-surface in the lateral direction of the actuator main body 4. Common side surface electrodes 48a are formed on the other one of the short-side surfaces to be respectively located at both end portions of the short side-surface in the lateral direction of the actuator main body 4.

As shown in FIGS. 10A-10D, the principal surface of the piezoelectric layer 41 is divided into quadrants, i.e., two areas in the longitudinal direction and two areas in the lateral direction. The first power-feeding electrode layer 44A includes a pair of first electrodes 42a and 42b respectively formed on one of pairs of diagonally-aligned areas of the principal surface, and the second power-feeding electrode layer 44B includes a pair of second electrodes 43a and 43b formed on the other pair of diagonally-aligned areas. In the first power-feeding electrode layer 44A, the first electrodes 42a and 42b are placed in conduction through a first conduction electrode 42c. In the second power-feeding electrode layer 44B, the second electrodes 43a and 43b are placed in conduction through a second conduction electrode 43c.

The first electrodes 42a and 42b and the second electrodes 43a and 43b face the common electrode layer 45 with the piezoelectric layer 41 being interposed therebetween. A lead electrode 42d is formed to extend from the first electrode 42a to a first external electrode 46a formed on an adjacent one of the short-side surfaces of the piezoelectric layer 41. A lead electrode 42d is formed to extend from the first electrode 42b to a first connecting electrode 46b formed on an adjacent one of the long-side surfaces of the piezoelectric layer 41. A lead electrode 43d is formed to extend from the second electrode 43a to a second external electrode 47a formed on an adjacent one of the short-side surfaces of the piezoelectric layers 41. A lead electrode 43d is formed to extend from the second electrode 43b to a second connecting electrode 47b formed on an adjacent one of the long-side surfaces of the piezoelectric layer 41.

Each of the common electrode layers 45 has a substantially rectangular shape, and covers almost the entire principal surface of an associated one of the piezoelectric layers 41. Lead electrodes 45a are formed to extend from a short-side portion of each of the common electrode layers 45 to the common external electrodes 48a formed on one of the short-side surfaces of the piezoelectric layer 41.

When the piezoelectric layers 41 with the above-described electrode layers printed thereon are stacked, the first external electrodes 46a, the first connecting electrodes 46b, the second external electrodes 47a, the second connecting electrode 47b, and the common external electrodes 48a which are formed on the side surfaces of the piezoelectric layers 41 are respectively connected to one another in the stacking direction, thereby forming respectively a first external electrode 46A, a first connecting electrode 46B, a second external electrode 47A, a second connecting electrode 47B, and common external electrodes 48, each of which is an integrated electrode, on the side surfaces of the actuator main body 4.

Consequently, the first electrodes 42a and 42b provided in the separate piezoelectric layers 41 are placed in conduction through the first external electrode 46A, the first connecting electrode 46B, and the first conduction electrode 42c of the first power-feeding electrode layer 44A. Similarly, the second electrodes 43a and 43b provided on the separate piezoelectric layers 41 are placed in conduction through the second external electrode 47A, the second connecting electrode 47B, and the second conduction electrode 43c of the second power-feeding electrode layer 44B. Furthermore, the common electrode layers 45 provided in the separate piezoelectric layers 41 are placed in conduction through the common external electrodes 48.

Flexible print substrates 49A and 49B are connected respectively to the short-side surfaces 40e and 40f of the actuator main body 4 with a pressure conductive resin material such as ACF, etc., interposed therebetween. The flexible print substrates 49A and 49B are also electrically connected to a control device, and power is fed to the actuator main body 4 from the control device via the flexible print substrates 49A and 49B. Conduction portions electrically connected respectively to the first and second external electrodes 46A and 47A are provided in the flexible print substrate 49A connected to the short-side surface 40e on which the first and second external electrodes 46A and 47A are provided. Note that the conduction portions are insulated from each other. Also, conduction portions electrically connected respectively to the common external electrodes 48 are provided to the flexible print substrate 49B connected to the short-side surface 40f on which the common external electrodes 48 are provided. The conduction portions, however, may be insulated from each other, or may be electrically connected to each other.

Two driver elements 3 are attached to the long-side surface (i.e., one of a pair of surfaces facing each other along a direction of bending vibration (described later), which is hereinafter referred to as an "installation surface") 40c of the actuator main body 4 configured as described above.

The driver elements 3 are cylindrical members, and are made of, e.g., zirconia, alumina, silicon nitride, silicon carbide, and tungsten carbide, etc. The driver elements 3 are arranged so that an axial direction thereof is along a thickness direction of the actuator main body 4. The driver elements 3 are attached to the installation surface 40c with adhesive to be in linear contact with the installation surface 40c.

The driver elements 3 are attached to the installation surface 40c at a distance of 30-35% of the length of the installation surface 40c inwardly from both ends of the actuator main body 4 in the longitudinal direction, i.e., at positions corresponding to antinodes of second-order mode bending vibration (described later) of the actuator main body 4, where the maximum vibration occurs.

In the actuator main body 4 configured as described above, the common external electrodes 48 are connected to ground to apply AC voltages having predetermined frequencies to the first and second external electrodes 46A and 47A with their phases being offset by 90°, thereby applying the AC voltages which are 90° out of phase with each other, to the pair of first electrodes 42a and 42b and the other pair of second electrodes 43a and 43b, which are positioned on the diagonal lines of the principal surface of the piezoelectric layer 41. Consequently, stretching vibration in the longitudinal direction of the actuator main body 4 (i.e., a so-called longitudinal vibration) and bending vibration in the lateral direction thereof (i.e., a so-called lateral vibration) are induced.

Resonance frequencies of the stretching and bending vibrations are determined by the actuator main body 4, i.e., the material, shape, etc. of the actuator main body 4. The resonance frequencies are also varied depending on force supporting the actuator main body 4 and positions at which the actuator main body 4 is supported. Considering the above-described conditions, the resonance frequencies are adjusted so be substantially equal to each other, and AC voltages having a frequency around the adjusted resonance frequency are applied to the first and second external electrodes 46A and 47A with their phases being offset by 90°. For example, if the shape etc. of the actuator main body 4 is designed such that the first-order mode stretching vibration (see FIG. 11) and the second-order mode bending vibration (see FIG. 12) have the same resonance frequency, and AC voltages having a frequency around the resonance frequency are applied with their phases being offset by 90° as described above, the first-order mode stretching vibration and the second-order mode bending vibration occur in harmony in the actuator main body 4. Thus, the shape of the actuator main body 4 is varied in the order illustrated in FIGS. 13A, 13B, 13C, and 13D.

Consequently, the driver elements 3 attached to the actuator main body 4 provide substantially elliptical motion, i.e., orbit motion, on a plane parallel to the principal surface of the actuator main body 4 (a plane parallel to the plane of the page of FIG. 13), i.e., a plane containing the longitudinal and lateral directions (in other words, a plane containing directions of the stretching and bending vibrations).

The actuator main body 4 configured as described above is arranged so that the driver elements 3 contact the sliding member 13 of the movable body 11.

The holder 5 is made of polycarbonate (containing glass fibers) and has a quadrangular prism shape. The holder 5 is attached to one of the long-side surfaces of the actuator main body 4 to which the driver elements 3 are not attached. The holder 5 is attached to the long-side surface 40d to extend in the thickness direction (i.e., the stacking direction) at a center of the actuator main body 4 in the longitudinal direction. Both end portions of the holder 5 protrude outwardly beyond the principal surfaces of the actuator main body 4 in the thickness direction.

Figure 14:
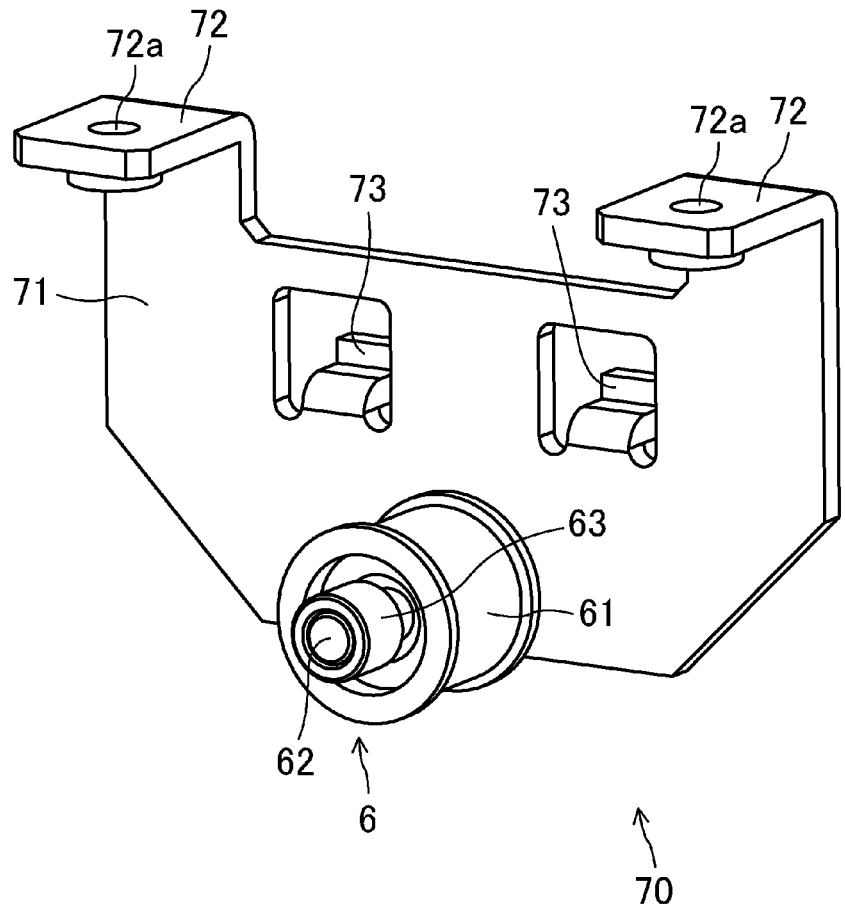
FIG. 14 is a perspective view of a connecting member body.
Figure 15:
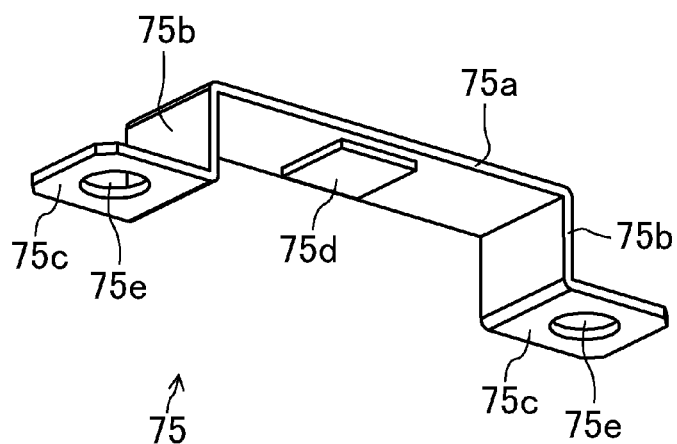
FIG. 15 is a perspective view of a plate spring.

The connecting member 7 includes a connecting member body 70, and a plate spring 75 which is attached to the connecting member body 70 and presses the actuator main body 4 toward the movable body 11. FIG. 14 is a perspective view of the connecting member body 70, and FIG. 15 is a perspective view of the plate spring 75.

The connecting member body 70 is made of a plate-like material. Specifically, the connecting member body 70 includes a flat plate portion 71, attachment portions 72 formed by bending two corner portions of the flat plate portion 71, and engagement portions 73 formed so that the engagement portions 73 and the attachment portions 72 oppositely protrude relative to the flat plate portion 71. The flat plate portion 71 has a substantially hexagonal shape formed by cutting off a top corner of a pentagonal shape in the form of baseball home plate. The attachment portions 72 are provided at both ends of a side portion of the flat plate portion 71 which is opposed to a portion thereof at which the corner of the pentagonal shape has been cut off. Screw holes 72a are formed respectively in the attachment portions 72. The plate spring 75 is attached to the attachment portions 72. The engagement portions 73 are formed in an area of the flat plate portion 71 located between the portion at which the corner of the pentagonal shape has been cut off and the attachment portions 72, and are bent so that the engagement portions 73 and the attachment portions 72 oppositely protrude relative to the flat plate portion 71. Respective end portions of the engagement portions 73 are bent toward the attachment portions 72, and the each of the engagement portions 73 is in the form of a hook. The two engagement portions 73 are arranged along a direction parallel to the direction along which the two attachment portions 72 are arranged.

The roller 6 is attached to the flat plate portion 71 to be located around the portion of the flat plate portion 71 at which the corner of the pentagonal shape has been cut off. Specifically, the roller 6 includes an annular roller body 61, a roller shaft 62 which is inserted through the roller body 61, and a roller collar 63 which fits to an end of the roller shaft 62. The roller shaft 62 is attached to the flat plate portion 71 by swaging. The roller shaft 62 is provided at the same side of the flat plate portion 71 at which the attachment portions 72 is located. The roller body 61 is placed on the roller shaft 62 to fit thereto. With the roller body 61 fitting to the roller shaft 62, the roller collar 63 is placed to fit on the end of the roller shaft 62. A space is provided between the roller body 61 and the roller shaft 62 to allow the roller body 61 to rotate. On the other hand, almost no space is provided between the roller shaft 62 and the roller collar 63, and the end of the roller shaft 62 is pressed to closely fit to the roller collar 63. In the above-described manner, the roller collar 63 functions as a retaining member for the roller body 61.

The plate spring 75 is made of a bent metal sheet. Specifically, the plate spring 75 includes a top portion 75a, perpendicular plate portions 75b which respectively extend perpendicularly from both end portions of the top portion 75a, and flange portions 75c which respectively extend outwardly from ends of the perpendicular plate portions 75b in parallel to the top portion 75a. The entire plate spring 75 is formed to have a raised shape. As will be specifically describe, the plate spring 75 is placed over the actuator main body 4, thus biasing the actuator main body 4 toward the movable body 11. A buffer rubber member 75d is provided substantially at a center of the top portion 75a in the longitudinal direction. The holder 5 attached to the actuator main body 4 contacts the buffer rubber 75d. Each of the flange portions 75c is provided with an insertion hole 75e formed to pass therethrough. The plate spring 75 is secured to the attachment portions 72 of the connecting member body 70 with screws. This attachment structure will be described later.

Figure 16:
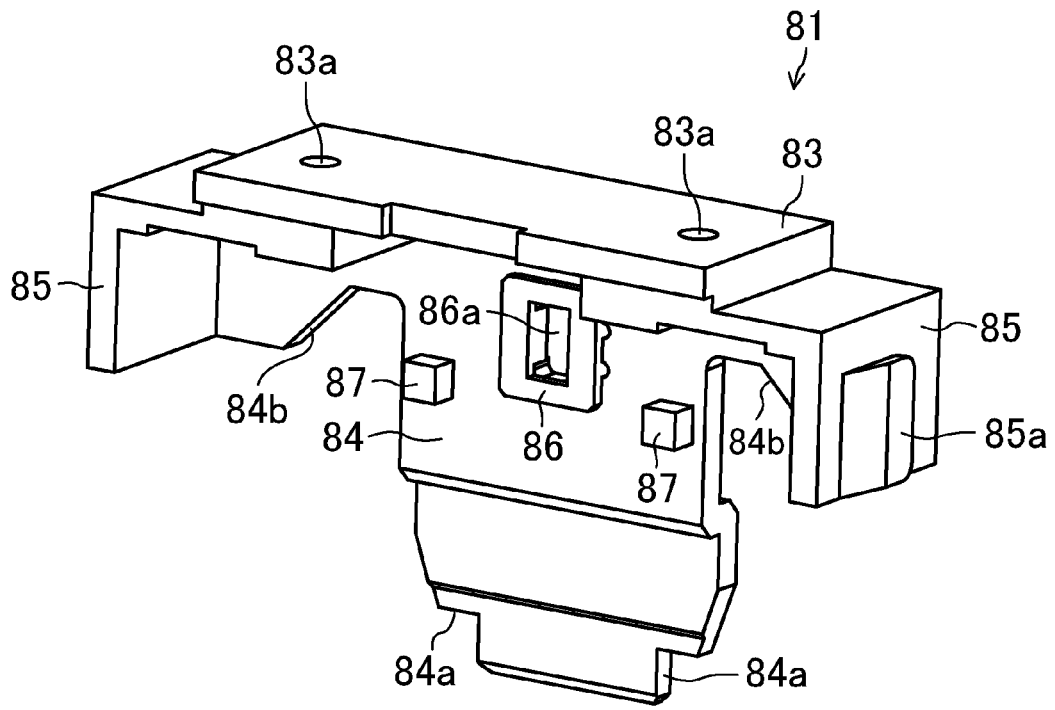
FIG. 16 is a perspective view of a first support unit.
Figure 17:
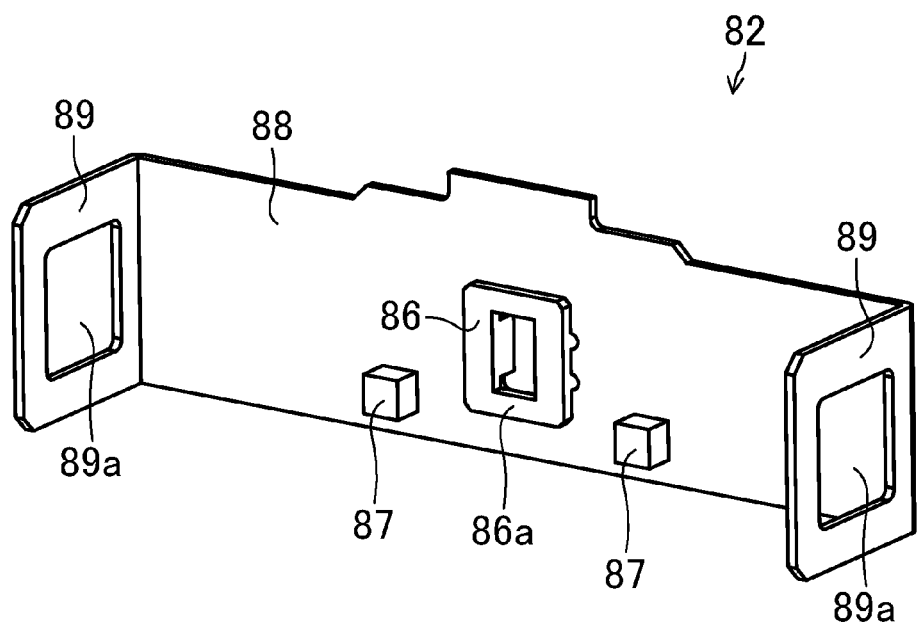
FIG. 17 is a perspective view of a second support unit.

The support body 8 includes a first support unit 81 and a second support unit 82, and has a substantially box shape with one end open. FIG. 16 is a perspective view of the first support unit 81. FIG. 17 is a perspective view of the second support unit 82.

The first support unit 81 includes a top portion 83 having a substantially rectangular shape, a first support plate 84 which is attached to the top portion 83 to extend perpendicularly from a long side of the top portion 83, and side plates 85 attached to the top portion 83 to respectively extend perpendicularly from the short sides of the top portion 83. Two screw holes 83a are formed in the top portion 83. Using the screw holes 83a, the ultrasonic actuator 2 is attached to the frame body 151 with screws. An opening is formed substantially at a center of the first support plate 84, and a guide member 86 fits in the opening. A guide hole 86a is formed in the guide member 86 to pass therethrough. The guide hole 86a is formed as a long hole extending in the normal direction of the top portion 83. The holder 5 is inserted through the guide hole 86a. Buffer rubber members 87 are provided at parts of the first support plate 84 located closer to a distal end of the first support plate 84 than the guide member 86. Two notches 84a are formed at the distal end portion of the first support plate 84. The engagement portions 73 of the connecting member body 70 are respectively engaged in the notches 84a. Furthermore, two notches 84b are formed at parts of the first support plate 84 located outside the buffer rubber members 87. The notches 84b are provided to prevent interference with the flexible print substrates 49A and 49B. Each of the side plates 85 is provided with an engagement protrusion 85a protruding outwardly the first support unit 81. The second support unit 82 is engaged to the engagement protrusions 85a.

The second support unit 82 includes a substantially rectangular second support plate 88, and side plates 89 which extend perpendicularly from both of short sides of the second support plate 88. An opening is formed substantially at a center of the second support plate 88. Similar to the first support unit 81, a guide member 86 fits in the opening. Also, similar to the first support unit 81, two buffer rubber members 87 are provided at parts of the second support plate 88 located at both sides of the guide member 86. An engagement hole 89a is formed in each of the side plates 89. The engagement hole 89a is larger than the engagement protrusion 85a of the first support unit 81.

The second support unit 82 configured as described above is placed over the first support unit 81 to be attached thereto such that the side plates 85 of the first support unit 81 are sandwiched between the two side plates 89. In this configuration, a distance between respective inner surfaces of the two side plates 89 is slightly longer than a distance between respective outer surfaces of the two side plates 85 of the first support unit 81, but is shorter than a distance between respective tops of the two engagement protrusions 85a. That is, when the second support unit 82 is being attached to the first support unit 81, the side plates 89 are respectively placed over the side plates 85, and gradually mount onto the engagement protrusions 85a. At the same moment when the engagement protrusions 85a fit in the engagement holes 89a of the side plates 89, the side plates 89 return to the original state. Thus, with the engagement protrusions 85a engaged in the engagement holes 89a of the side plates 89, the second support unit 82 is attached to the first support unit 81. In this state, the guide member 86 and the buffer rubber members 87 which are provided on the first support unit 81 are located to be respectively opposed to the guide member 86 and the buffer rubber members 87 which are provided on the second support unit 82.

Figure 18:
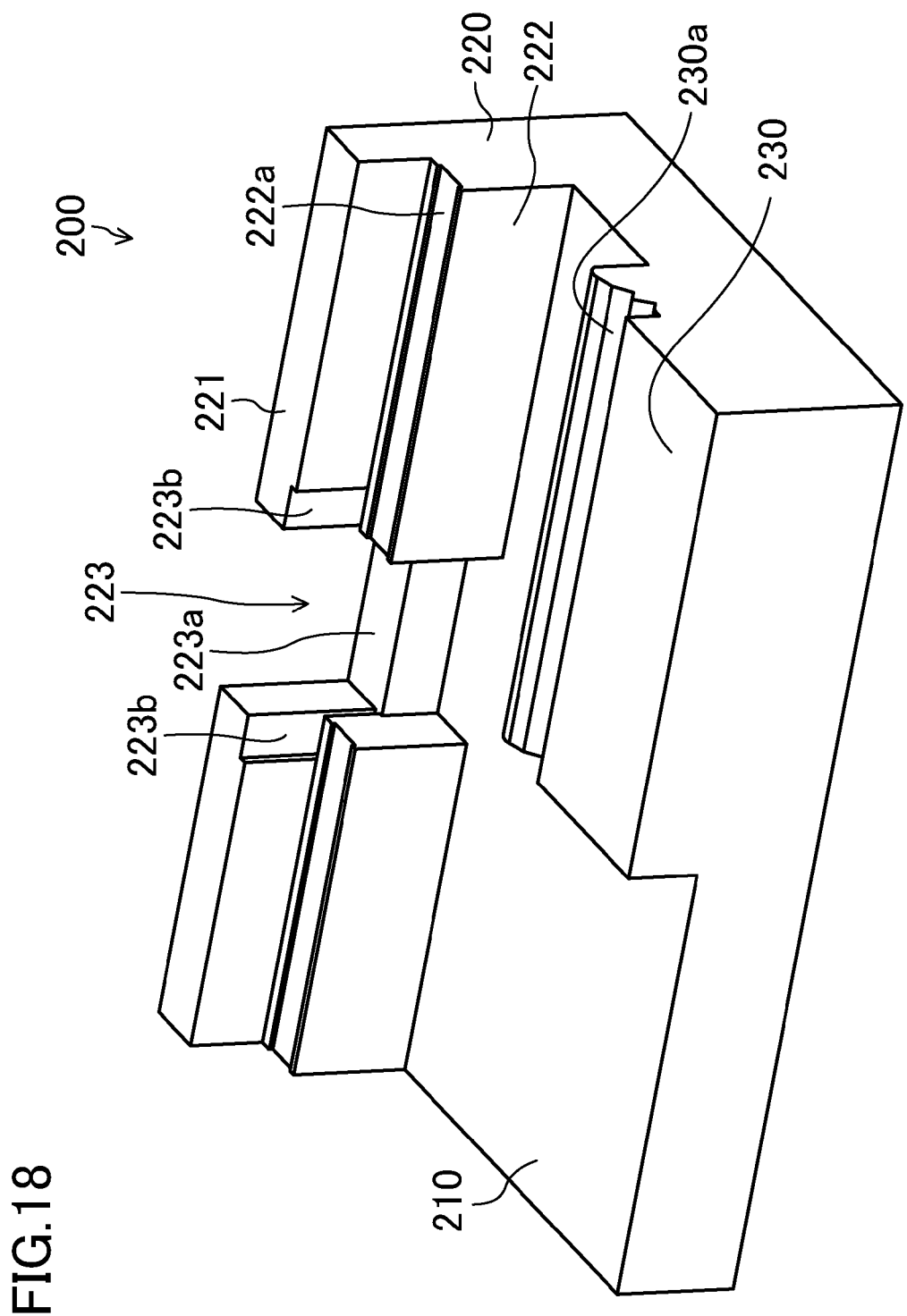
FIG. 18 is a perspective view of an installation jig.

Subsequently, a method for assembling the ultrasonic actuator 2 configured as described above, and a method for attaching the ultrasonic actuator 2 to the focus lens frame 152 will be described. The ultrasonic actuator 2 is assembled and attached to the focus lens frame 152 using an installation jig 200. FIG. 18 is a perspective view of the installation jig 200.

The installation jig 200 is a block-shaped member and includes various installation surfaces and guide grooves. Specifically, the installation jig 200 includes a base member 210 having a rectangular shape as viewed from the top, a step wall portion 220 formed to extend upright from a long-side portion of the base member 210 and have a step, and a pedestal portion 230 formed at another long side portion of the base member 210.

The step wall portion 220 has a shape including high-wall portions 221 with a relatively large height and low-wall portions 222 with a relatively small height which overlap each other. Guide grooves 222a are formed respectively in upper end surfaces of the low-wall portions 222. A notch 223 is formed at a central portion of the step wall portion 220 in the longitudinal direction, thereby dividing the step wall portion 220 into two in the longitudinal direction. A bottom portion 223a of the notch 223 does not reach the base member 210, and is higher than the base member 210 and lower than the low-wall portions 222. At the notch 223, a void 223b is provided between each of the high-wall portions 221 and an associated one of the low-wall portions 222. A guide groove 230a is formed in the pedestal 230 to extend in parallel to the guide grooves 222a of the low-wall portions 222.

Figure 19:
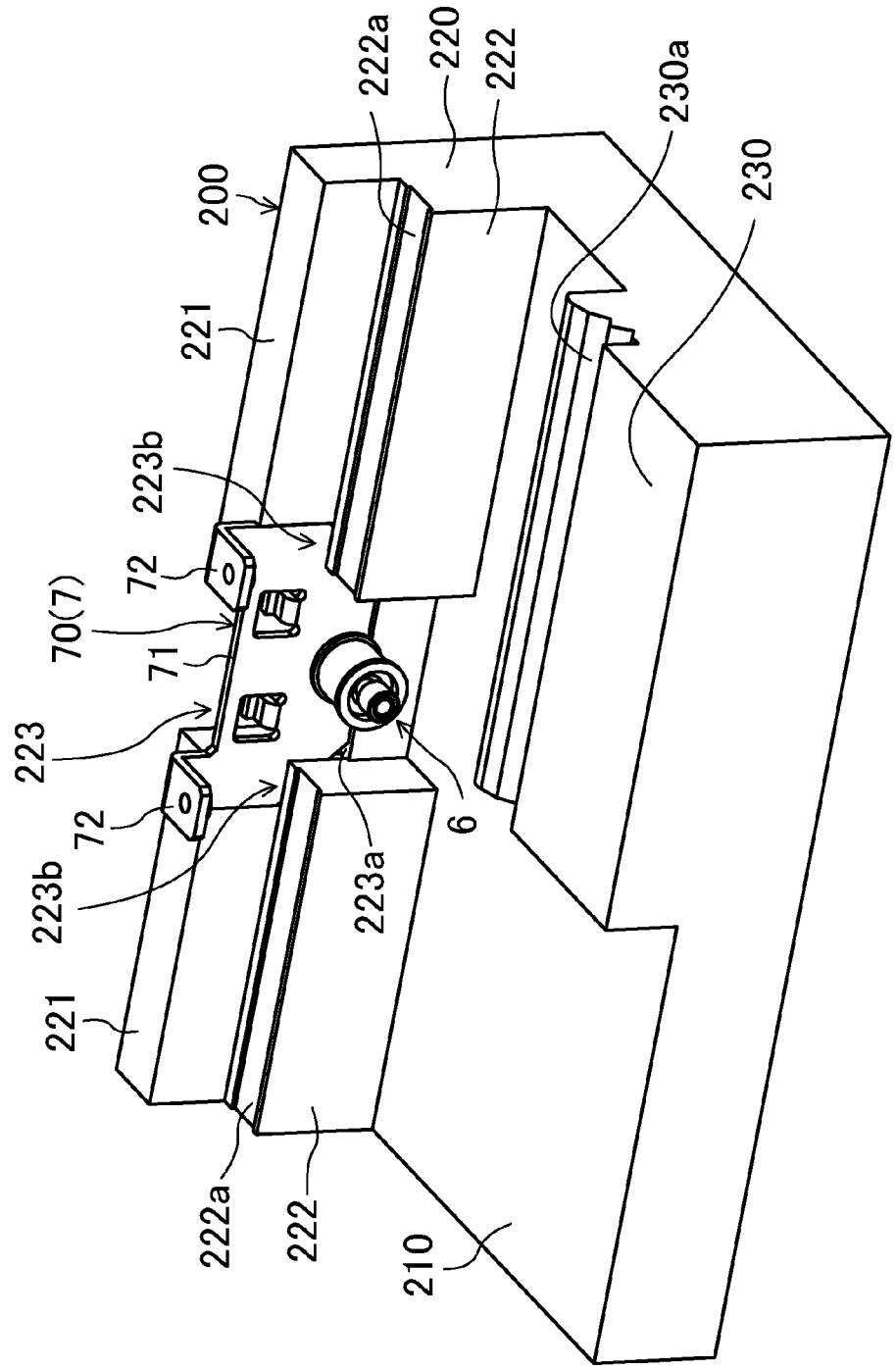
FIG. 19 is a perspective view illustrating a state where a connecting member body is installed in an installation jig.
Figure 20:
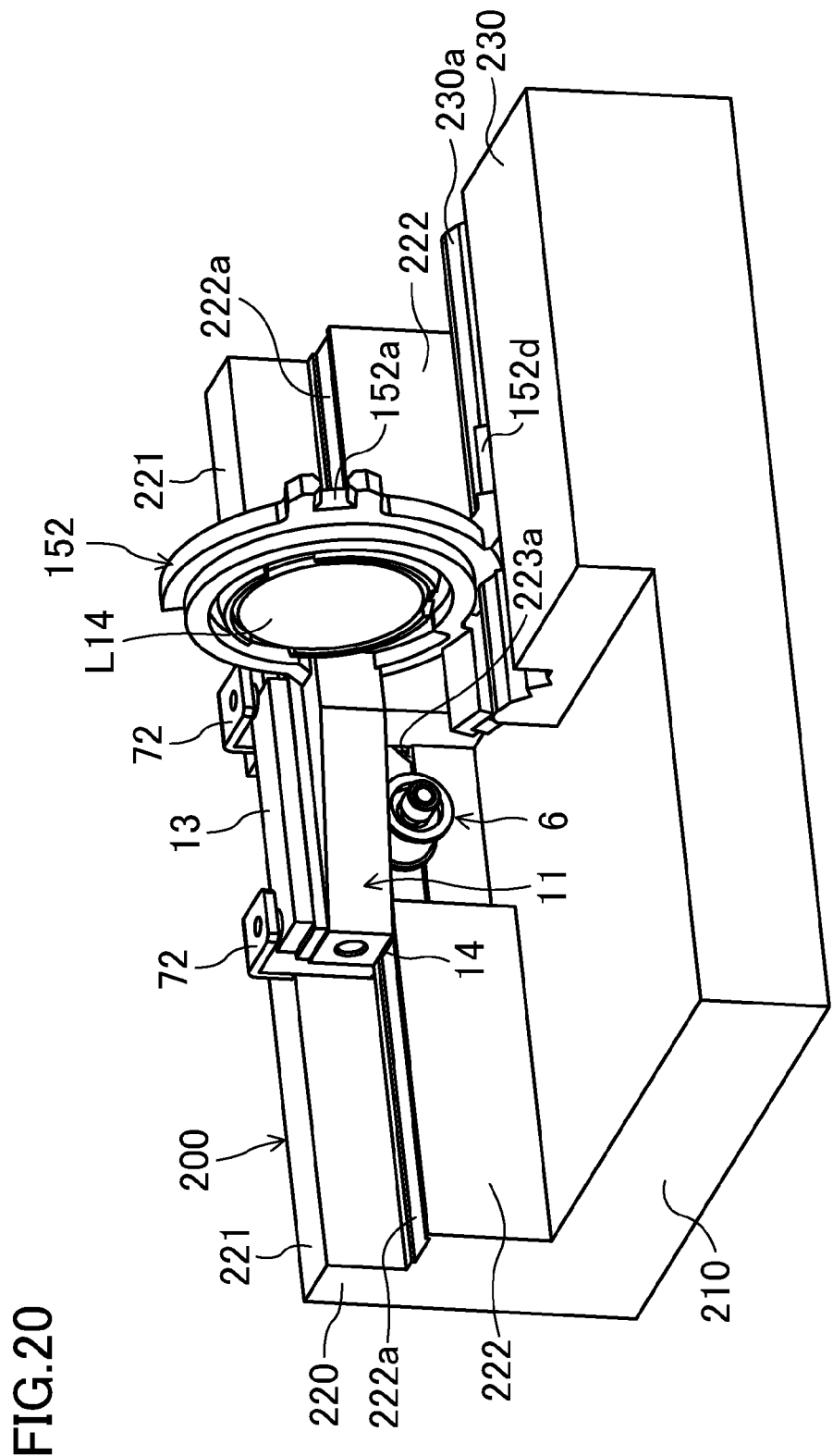
FIG. 20 is a perspective view illustrating a state where a focus lens frame is installed in an installation jig.
Figure 21:
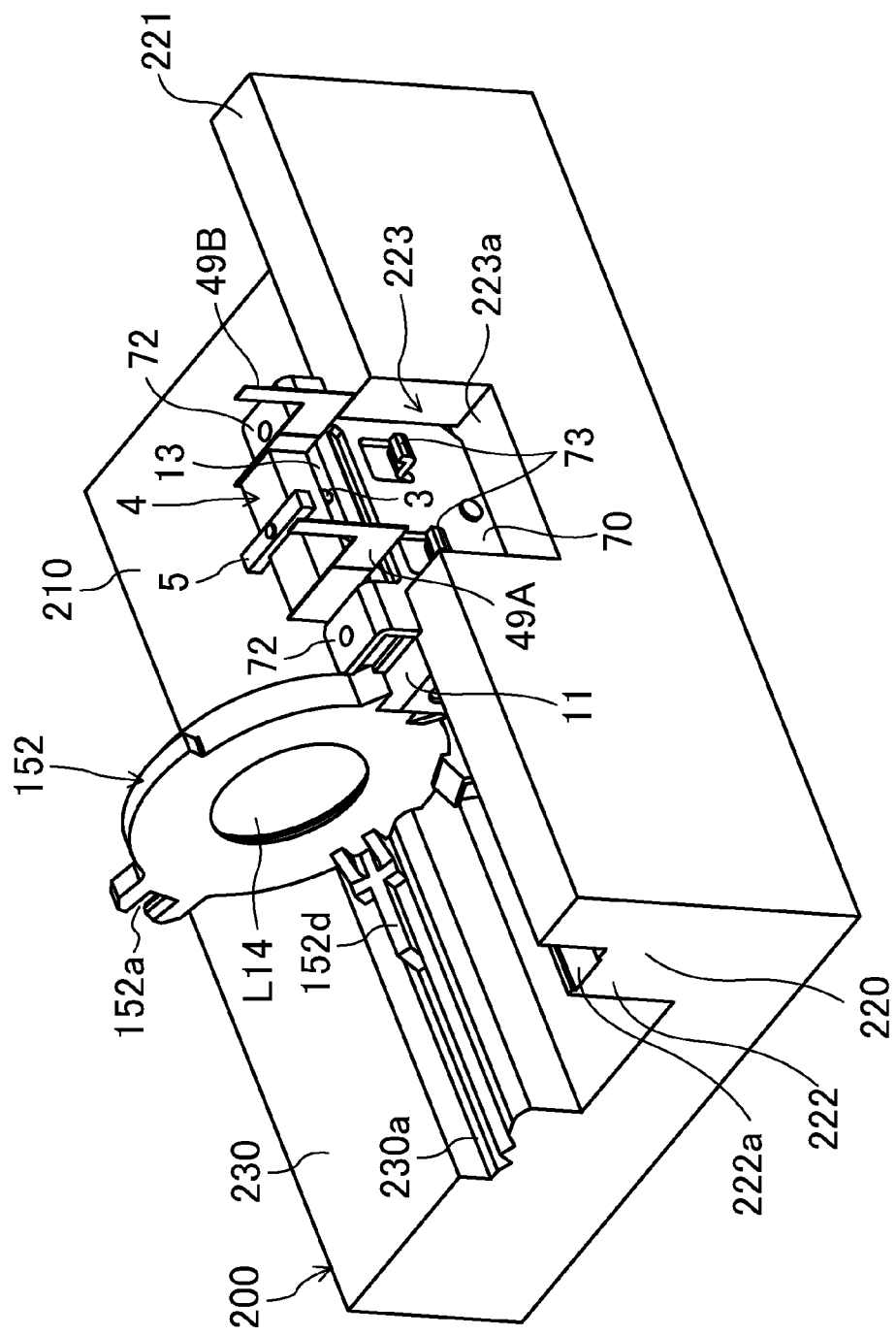
FIG. 21 is a perspective view illustrating a state where an actuator main body is placed on a focus lens frame.
Figure 22:
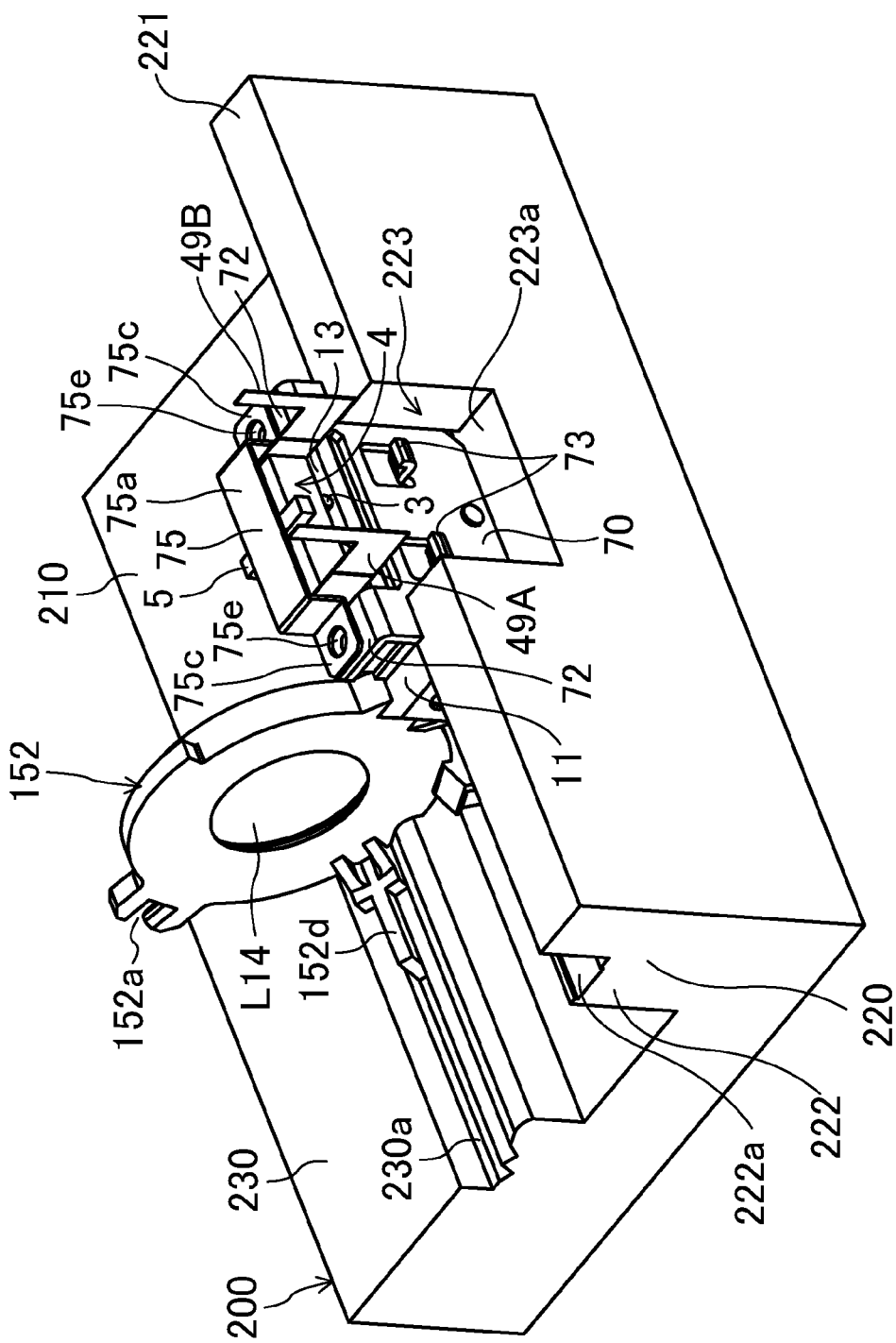
FIG. 22 is a perspective view illustrating a state where a plate spring is placed on an actuator main body.
Figure 23:
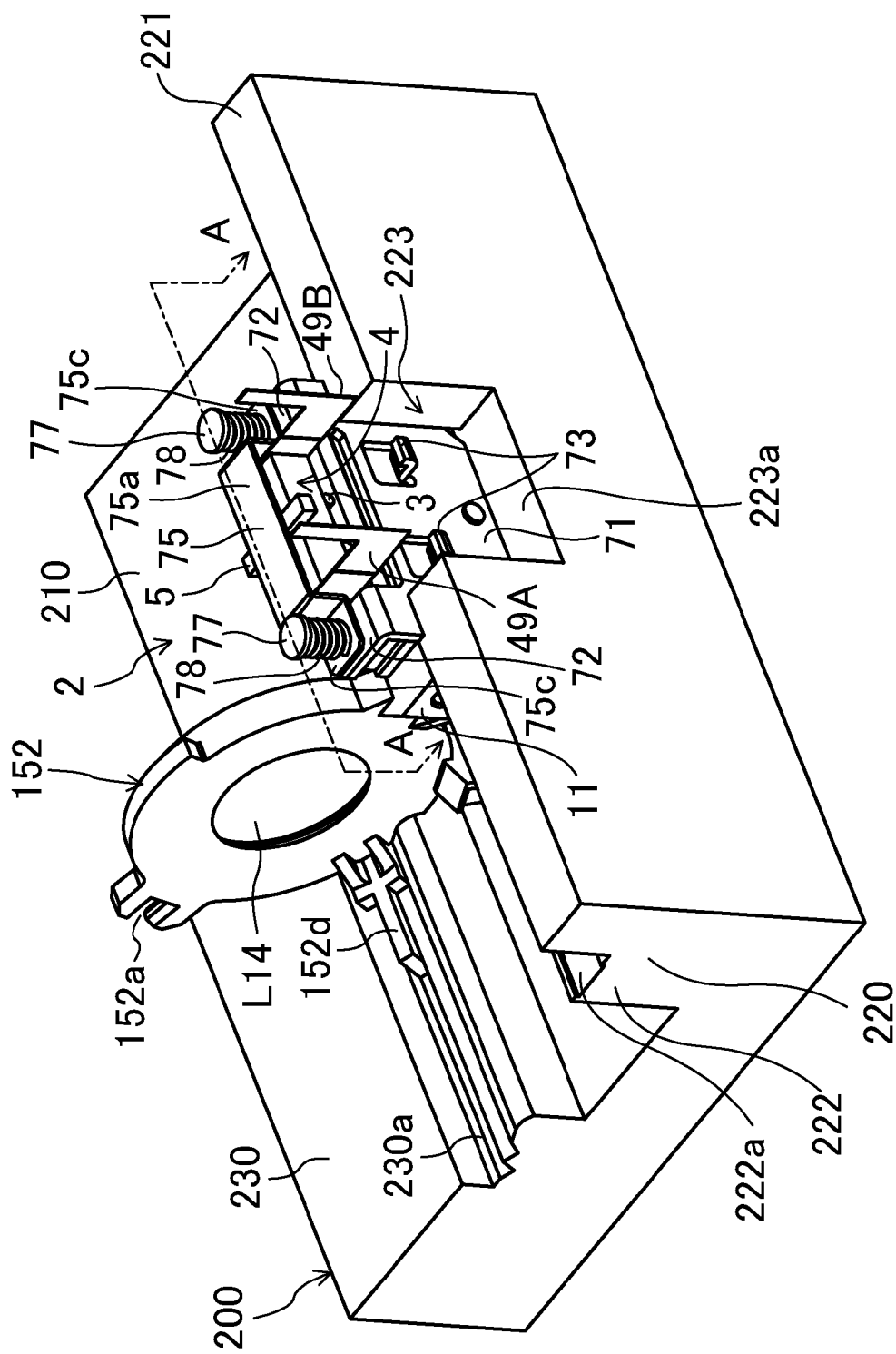
FIG. 23 is a perspective view illustrating a state where a plate spring is attached to a connecting member body with stepped screws.
Figure 24:
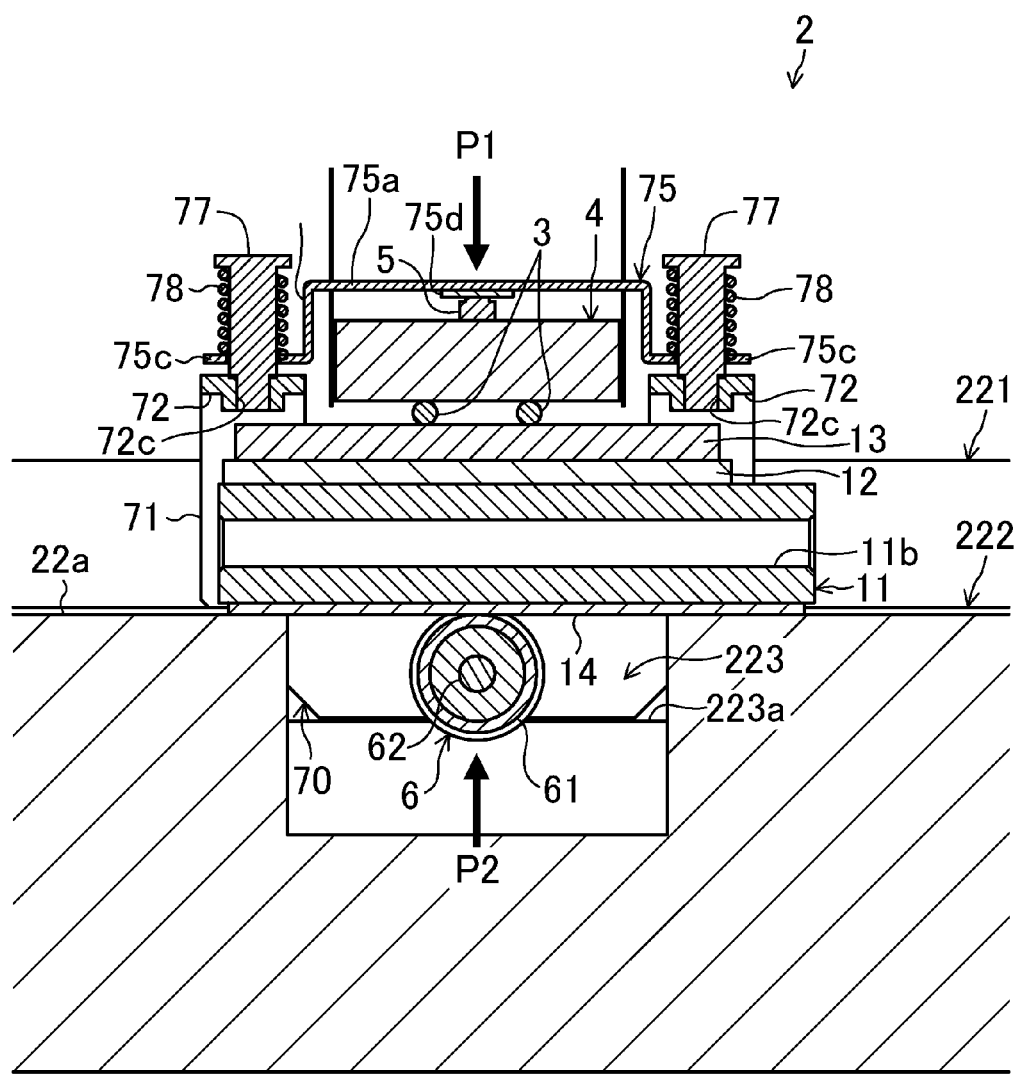
FIG. 24 is a cross-sectional view taken along the line A-A of FIG. 23.
Figure 25:
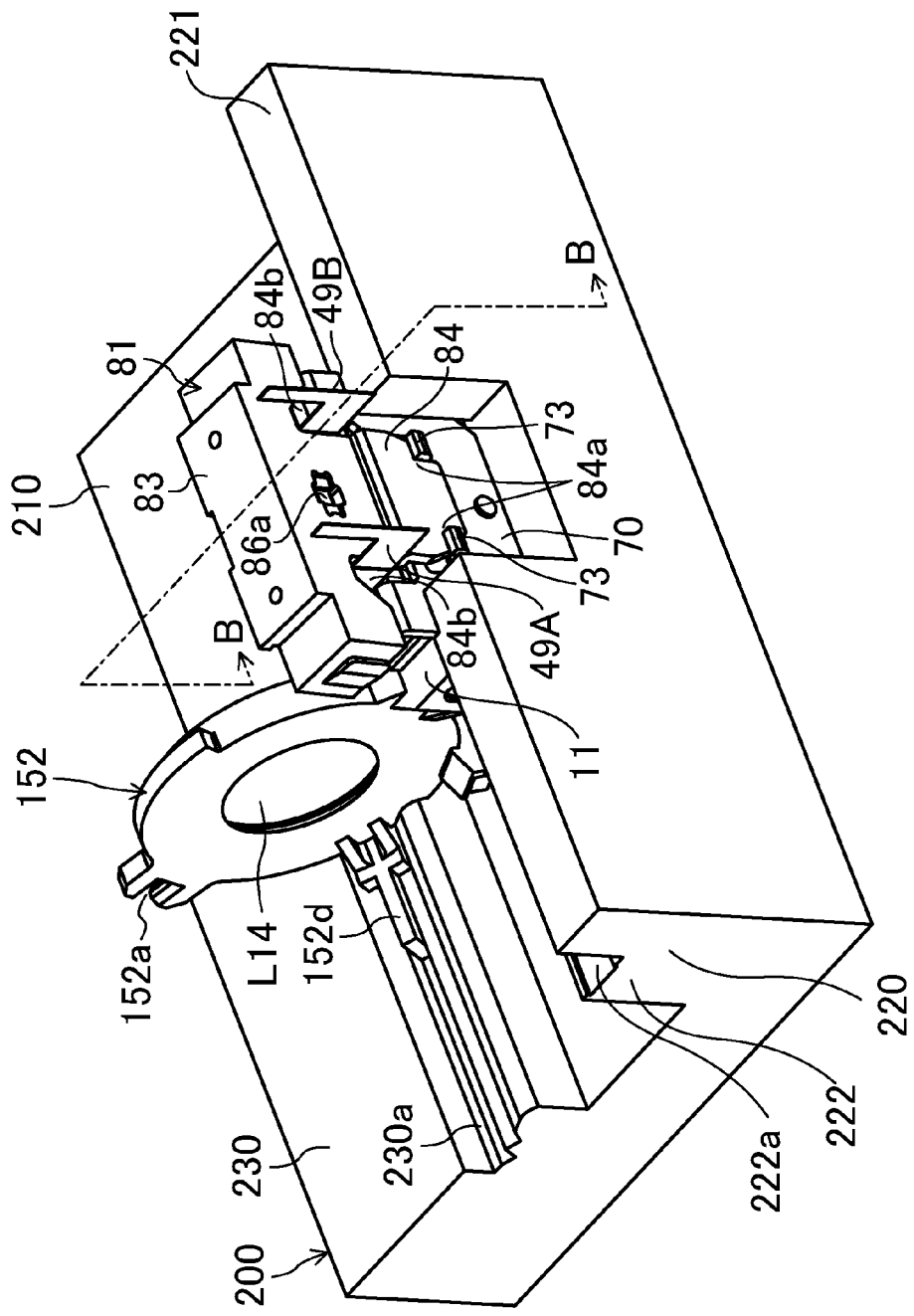
FIG. 25 is a perspective view illustrating a state where a first support unit is installed.
Figure 26:
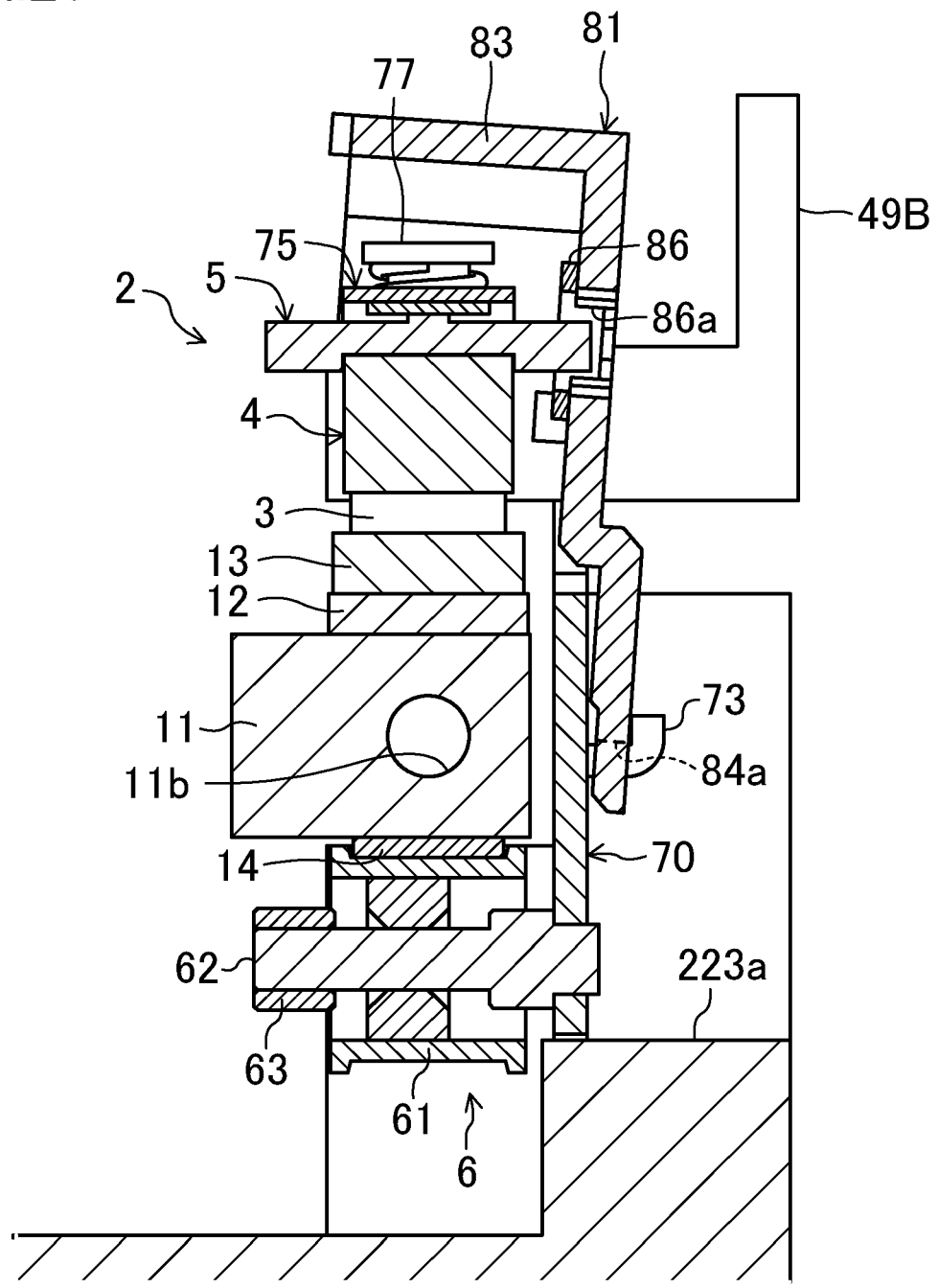
FIG. 26 is a cross-sectional view taken along the line B-B of FIG. 25.
Figure 27:
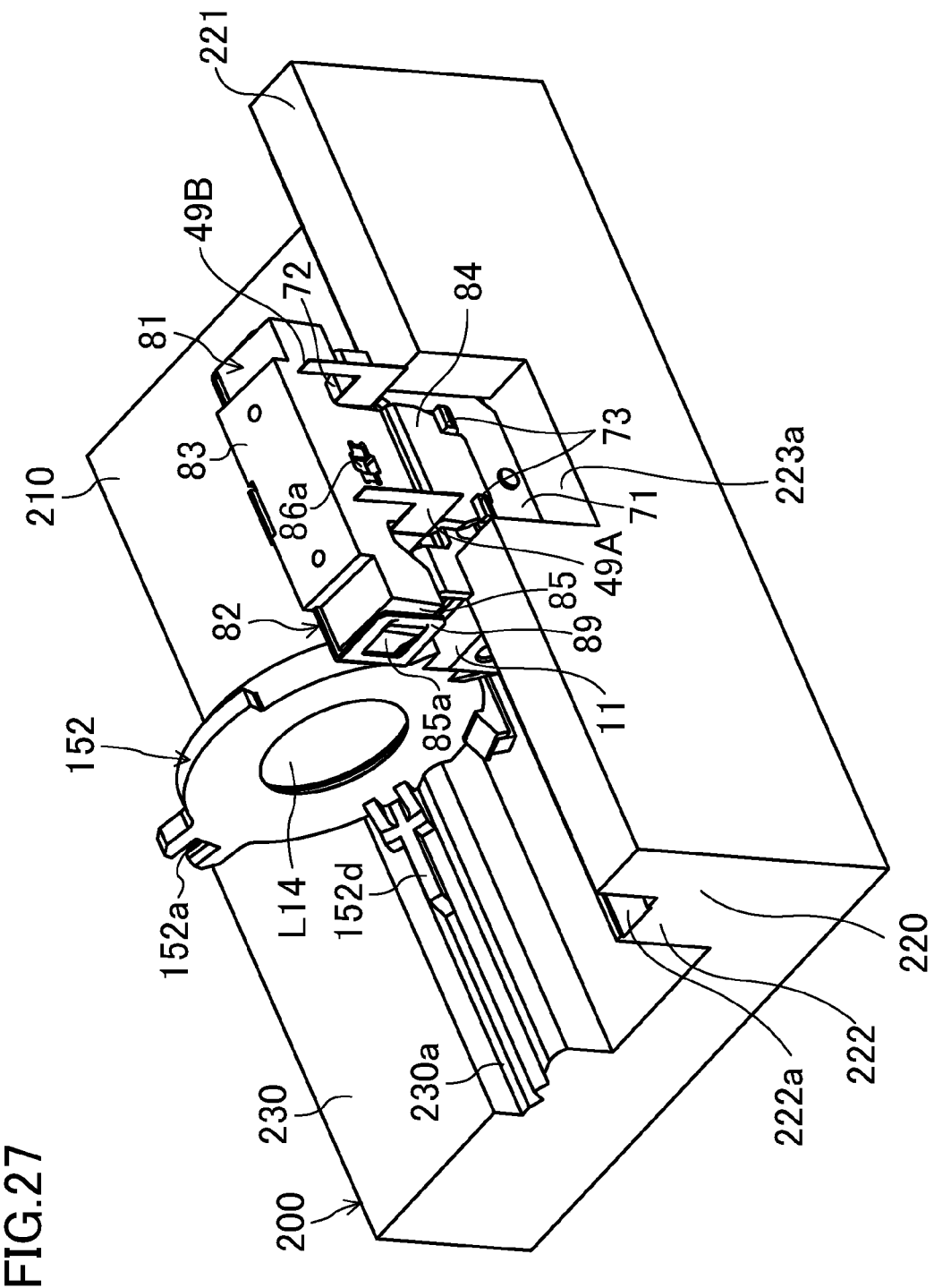
FIG. 27 is a perspective view illustrating a state immediately after a start of attachment of a second support unit to a first support unit.
Figure 28:
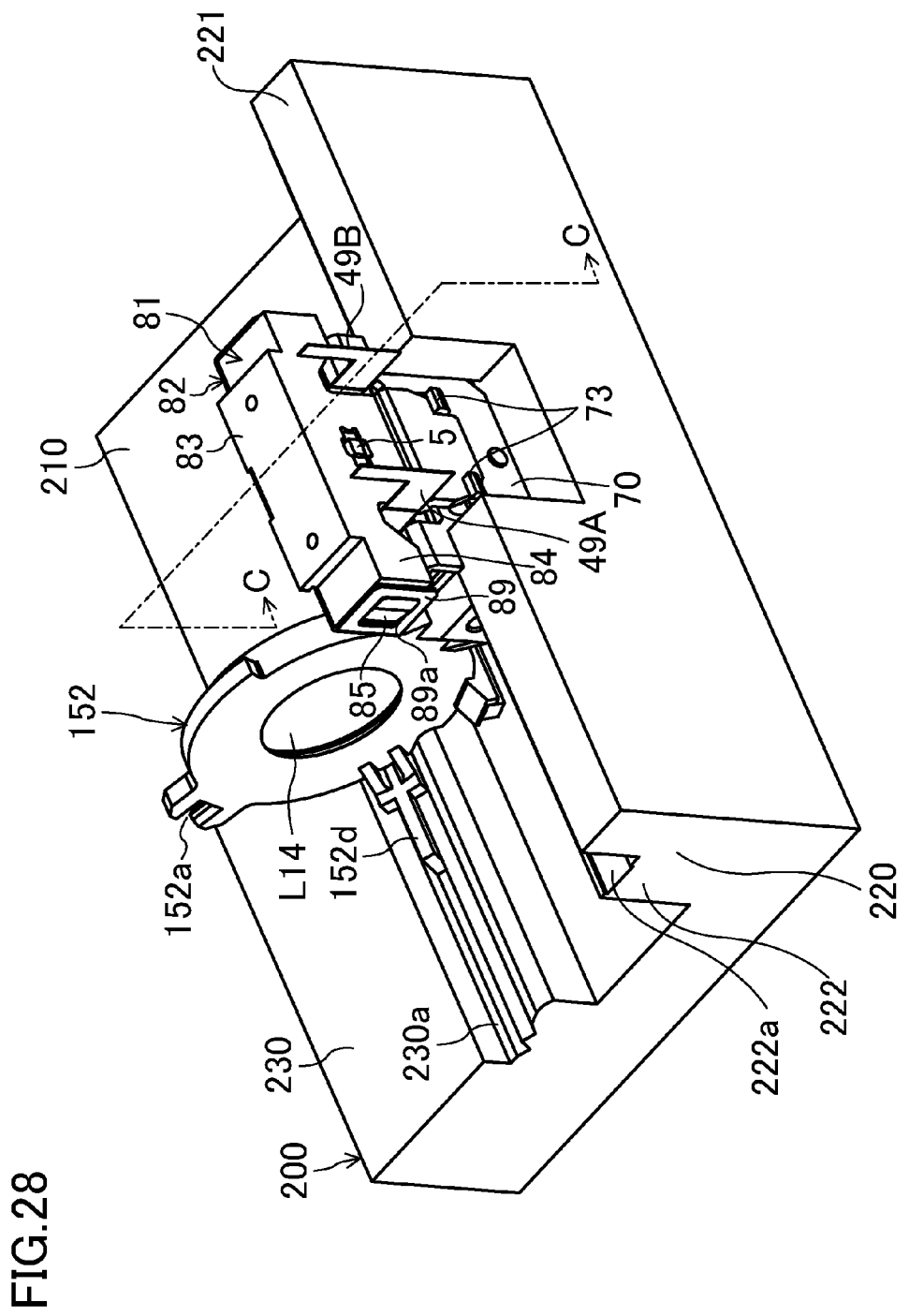
FIG. 28 is a perspective view illustrating a state after the completion of attachment of a second support unit to a first support unit.
Figure 29:
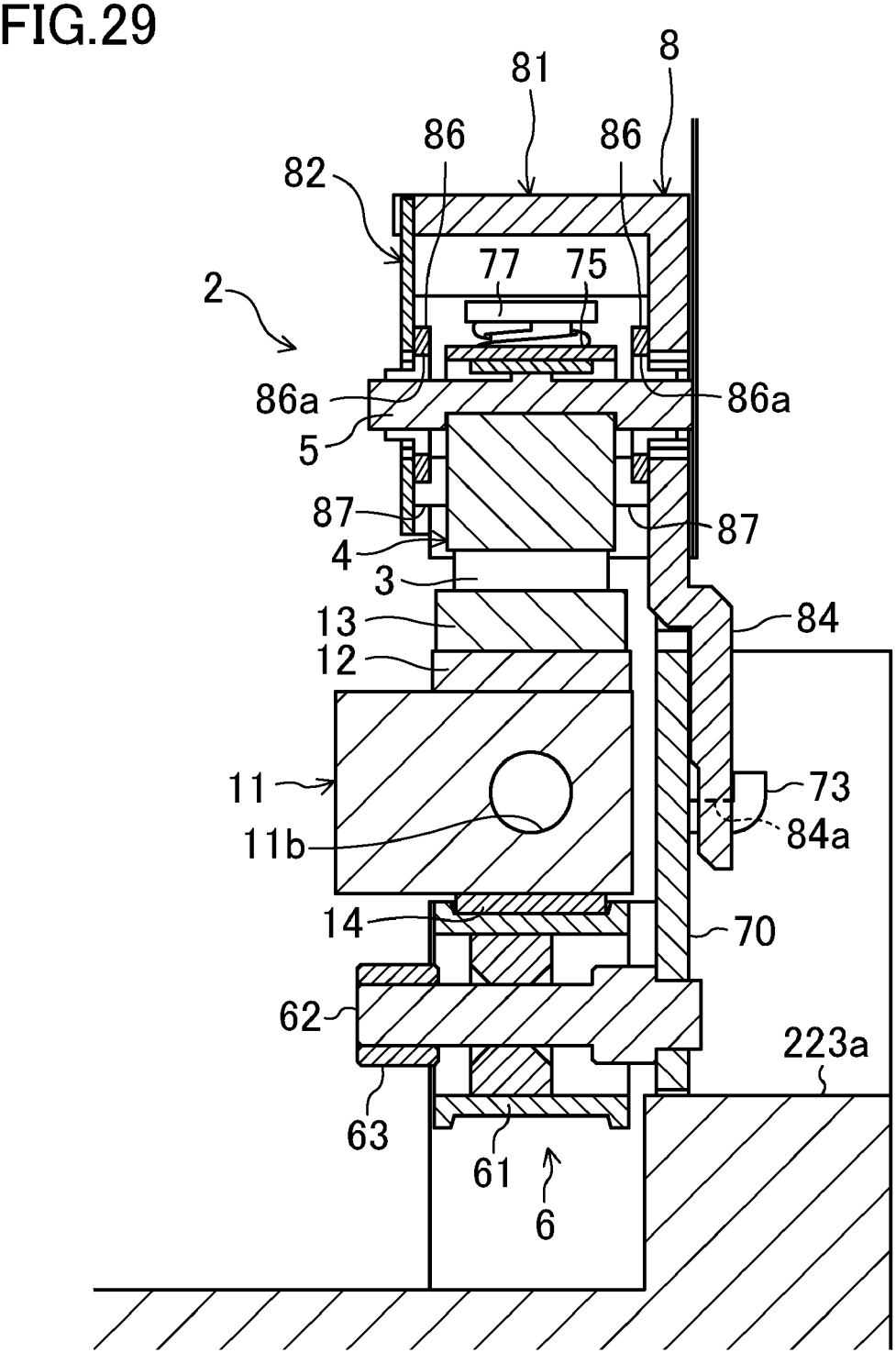
FIG. 29 is a cross-sectional view taken along the line C-C of FIG. 28.
Figure 30:
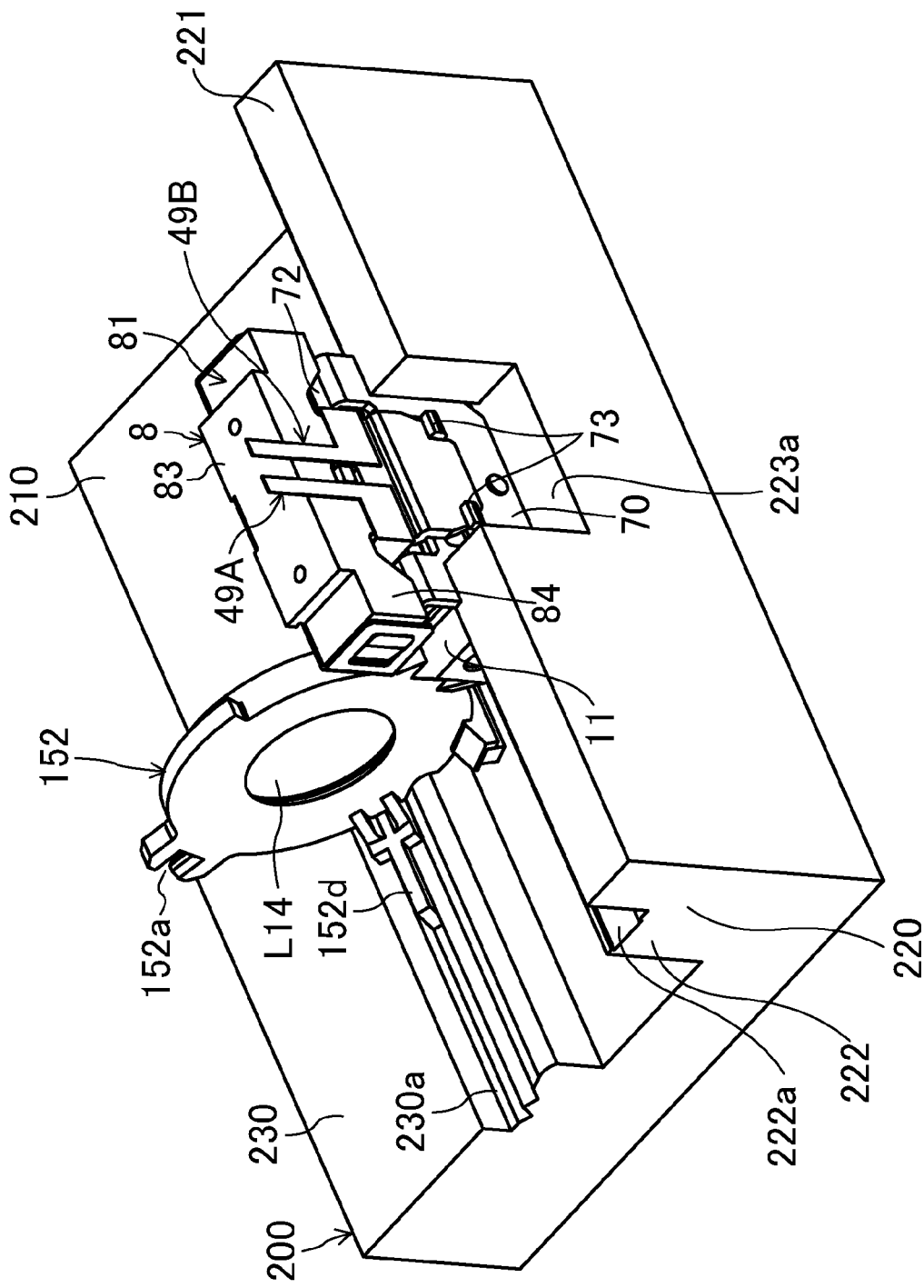
FIG. 30 is a perspective view illustrating a state where flexible print substrates are fixed to a support body.

A method for assembling the ultrasonic actuator 2 using the installation jig 200, and a method for attaching the ultrasonic actuator 2 to the focus lens frame 152 using the installation jig 200 will be described with reference to FIGS. 19-30. FIG. 19 is a perspective view illustrating a state where the connecting member body 70 is installed in the installation jig 200. FIG. 20 is a perspective view illustrating a state where the focus lens frame 152 is installed in the installation jig 200. FIG. 21 is a perspective view illustrating a state where the actuator main body 4 is placed on the focus lens frame 152. FIG. 22 is a perspective view illustrating a state where the plate spring 75 is placed on the actuator main body 4. FIG. 23 is a perspective view illustrating a state where the plate spring 75 is attached to the connecting member body with stepped screws 77. FIG. 24 is a cross-sectional view taken along the line A-A of FIG. 23. FIG. 25 is a perspective view illustrating a state where the first support unit 81 is installed. FIG. 26 is a cross-sectional view taken along the line B-B of FIG. 25. FIG. 27 is a perspective view illustrating a state immediately after a start of attachment of the second support unit 82 to the first support unit 81. FIG. 28 is a perspective view illustrating a state after the completion of attachment of the second support unit 82 to the first support unit 81. FIG. 29 is a cross-sectional view taken along the line C-C of FIG. 28. FIG. 30 is a perspective view illustrating a state where the flexible print substrates 49A and 49B are fixed to the support body 8.

First, as shown in FIG. 19, the connecting member body 70 of the connecting member 7 is arranged in the notch 223 of the installation jig 200. Specifically, the connecting member body 70 is placed at the bottom portion 223a of the notch 223 such that the roller 6 is positioned higher and the attachment portions 72 is positioned lower, and the roller 6 and the attachment portions 72 face the low-wall portions 222 side. In this state, the flat plate portion 71 fits in the voids 223b between the high-wall portions 221 and the low-wall portions 222, thereby positioning the connecting member body 70.

Next, as shown in FIG. 20, the movable body 11 of the focus lens frame 152 is arranged between the attachment portions 72 of the connecting member body 70 and the roller 6. Specifically, the movable body 11 is placed on the guide grooves 222a of the low-wall portions 222 of the installation jig 200. In this state, the sliding member 14 of the movable body 11 fits in the guide grooves 222a. Also, the light shield plate 152d of the focus lens frame 152 fits in the guide groove 230a of the pedestal 230. That is, the movable body 11 of the focus lens frame 152 is placed on the guide groove 222a of one of the low-wall portions 222, the light shield plate 152d fits in the guide groove 230a of the pedestal 230, and, in this state, the focus lens frame 152 is moved along the guide grooves 222a and 230a. In the above-described manner, the movable body 11 is arranged between the attachment portions 72 of the connecting member body 70 and the roller 6. In this configuration, the roller 6 does not contact the sliding member 14 of the movable body 11, and a space is provided between the roller 6 and the sliding member 14. Also, the attachment portions 72 do contact the sliding member 13 of the movable body 11.

Subsequently, as shown in FIG. 21, the actuator main body 4 is placed on the sliding member 13 of the movable body 11. Specifically, the actuator main body 4 is placed on the sliding member 13 such that the driver elements 3 contact the sliding member 13 and the flexible print substrates 49A and 49B face the high-wall portions 221 side.

Furthermore, as shown in FIG. 22, the plate spring 75 is placed on the actuator main body 4. Specifically, the plate spring 75 is placed on the holder 5 of the actuator main body 4 such that the top portion 75a is positioned at an upper side and the flange portions 75c are positioned at a lower. In this configuration, the buffer rubber 75d (not shown in FIG. 22) of the top portion 75a contact the holder 5. The flange portions 75c respectively face the attachment portions 72 of the connecting member body 70, but a space is provided between each of the flange portions 75c and an associated one of the attachment portions 72. Furthermore, the insertion holes 75e of the flange portions 75c are arranged to be coaxial with the screw holes 72a (not shown in FIG. 22) of the attachment portions 72.

As shown in FIG. 23, the plate spring 75 is attached to the connecting member body 70 with the stepped screws 77. Specifically, coil springs 78 are respectively placed over the stepped screws 77 to fit thereto. The stepped screws 77, being in this state, are inserted through the insertion holes 75e (not shown in FIG. 23) of the flange portions 75c, and are secured in the screw holes 72a (not shown in FIG. 23) of the attachment portions 72. Before the stepped screws 77 are secured, the connecting member body 70 is placed on the bottom portion 223a of the notch 223 of the installation jig 200 with a space provided between the roller 6 and the movable body 11. However, when the stepped screws 77 are secured to the connecting member body 70, as shown FIG. 24, the connecting member body 70 lifts from the bottom portion 223a of the notch 223, and the roller 6 contacts the movable body 11 (specifically, the sliding member 14). In this state, each of the coil springs 78 is sandwiched between an associated one of heads of the stepped screws 77 and an associated one of flange portions 75c to be compressed and deformed. Spring force of the coil springs 78 caused by the compression deformation acts on the plate spring 75 and the stepped screws 77. Spring force acting on the plate spring 75 is transmitted to the actuator main body 4 via the holder 5, and biases the actuator main body 4 toward the movable body 11 (see the arrow P1 in FIG. 24). In this configuration, the two driver elements 3 are attached to the actuator main body 4, and thus, the attitude of the actuator main body 4 is automatically corrected so that the two driver elements 3 contact the movable body 11. That is, a state where only one of the driver elements 3 contact the movable body 11 does not occur. Spring force acting on the stepped screws 77 is transmitted to the roller 6 via the connecting member body 70, and biases the roller 6 toward the movable body 11 (see the arrow P2 in FIG. 24). In the above-described manner, the actuator main body 4 and the roller 6 are attached to the movable body 11, and thus, the generation of unnecessary prying force in the movable body 11 can be prevented or reduced. Pressing force acting from the actuator main body 4 to the movable body 11 has a direction opposite to that of pressing force acting from the roller 6 to the movable body 11, and the same magnitude as that of the pressing force acting from the roller 6 to the movable body 11, and thus, the pressing forces cancel each other. Therefore, it is not necessary to excessively reinforce the movable body 11, so that the size of the movable body 11 can be reduced, and furthermore, the size of the focus lens frame 152 can be reduced. Also, unnecessary force does not act on the focus main shaft 153 inserted through the movable body 11, and therefore, it is not necessary to excessively reinforce the focus main shaft 153. Furthermore, increase in friction force between the movable body 11 and the focus main shaft 153 can be prevented or reduced, and therefore, only small driving force is necessary to drive the focus lens frame 152. In addition, as a bearing of the focus main shaft 153, it is not necessary to use an expensive bearing such as a ball bearing, etc., thus allowing simplification of the configuration and reduction in cost. Furthermore, biasing force of the actuator main body 4 and the roller 6 is generated by the coil springs 78. Thus, as compared to the configuration in which such biasing force is generated by a plate spring, etc., the spring constant can be reduced, so that variations in biasing force can be reduced. Consequently, highly reliable focus driving can be realized.

Subsequently, the support body 8 is attached. First, as shown in FIG. 25, the first support unit 81 is placed on the plate spring 75 (not shown in FIG. 25) to cover the plate spring 75 such that the top portion 83 is positioned higher. In this state, as shown in FIG. 26, the notches 84a of the first support unit 81 are engaged in the engagement portions 73 of the connecting member body 70, and the holder 5 of the actuator main body 4 is inserted in the guide hole 86a. In this state, the flexible print substrates 49A and 49B extend outwardly beyond the first support unit 81.

Next, as shown in FIG. 27, the second support unit 82 is attached to the first support unit 81. Specifically, the second support unit 82 is arranged over the first support unit 81 to be attached thereto such that the side plates 85 of the first support unit 81 are sandwiched between the side plates 89 of the second support unit 82. In this state, the holder 5 (not shown in FIG. 27) of the actuator main body 4 is inserted in the guide hole 86a (not shown in FIG. 27) of the second support unit 82. As the second support unit 82 is being attached to the first support unit 81, the side plates 89 of the second support unit 82 move onto the engagement protrusions 85a of the side plates 85 of the first support unit 81. Then, as shown in FIG. 28, when the engagement protrusion 85a are placed to fit in the engagement holes 89a of the side plates 89, attachment of the second support unit 82 to the first support unit 81 is completed.

Thus, when attachment of the second support unit 82 to the first support unit 81 is completed, the actuator main body 4 is sandwiched between the buffer rubber members 87 of the first support unit 81 and the buffer rubber members 87 of the second support unit 82 to be held at both sides. The buffer rubber members 87 are slightly compressed and deformed to bias the actuator main body 4 at both sides thereof. The generation of noise due to vibration of the actuator main body 4 can be prevented or reduced by the buffer rubber members 87.

In the above-described configuration, the support body 8 is attached to the connecting member 7 only by engagement of the notches 84a of the first support unit 81 and the engagement portions 73 of the connecting member 7. Thus, the support body 8 swings with the notches 84a as a center, and the attitude of the support body 8 is automatically corrected so that the magnitude of biasing force from the buffer rubber members 87 of the first support unit 81 and the magnitude of biasing force from the buffer rubber members 87 of the second support unit 82 are equal to each other. As described above, the buffer rubber members 87 of the first support unit 81 and the buffer rubber members 87 of the first support unit 81 are caused to contact the both sides of the actuator main body 4, and then, be compressed and deformed, so that the generation of unnecessary force in buffer rubber members 87 can be prevented or reduced, and the buffer rubber members 87 can be precisely arranged at desired position relative to the actuator main body 4.

Lastly, as shown in FIG. 30, the flexible print substrates 49A and 49B are bent and are fixed to the first support unit 81 of the support body 8 with a double-sided adhesive tape, or adhesive, etc.

The ultrasonic actuator 2 and the focus lens frame 152 assembled in the above-described manner are attached to the frame body 151, with the focus main shaft 153 inserted in the through hole 11b of the movable body 11 and the focus secondary shaft 154 inserted through the notch 152a, using the screw holes 83a of the support body 8.

Now, a configuration of the roller 6 will be more specifically described.

Figure 31:
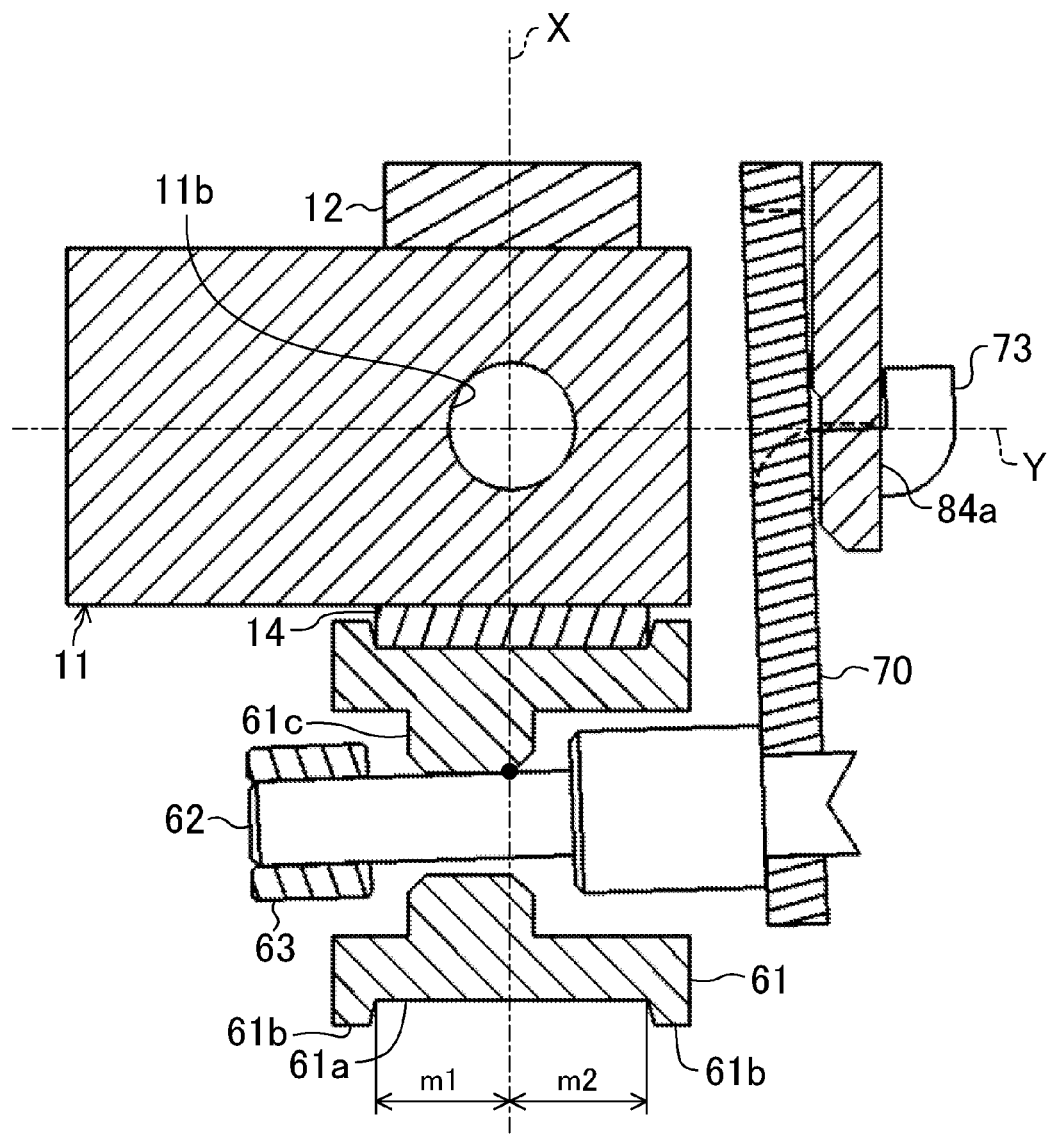
FIG. 31 is an enlarged view illustrating a configuration of a roller.

As shown in FIG. 31, the roller shaft 62 is inclined relative to a direction orthogonal to both of the axis direction of the through hole 11b of the movable body 11 and a bias direction (the X direction in FIG. 31) in which the movable body 11 is biased by the actuator main body 4 and the roller 6 (i.e., a direction orthogonal to both of a direction of stretching vibration and a direction of bending vibration of the actuator main body 4, which is the Y direction in FIG. 31, and will be referred to as the "orthogonal direction"). Specifically, the roller shaft 62 is inclined so that a distance of the roller shaft 62 from the movable body 11 increases toward the distal end of the roller shaft 62. The engagement portions 73 of the connecting member body 70 and the notches 84a of the support body 8 are formed so that the roller shaft 62 is inclined in the above-described manner.

The roller body 61 includes a cylinder portion 61a having a cylindrical shape, two flange portions 61b provided at both end portions of the cylinder portion 61a in an axis direction of the cylinder portion 61a, and a bearing portion 61c provided at an inner side of the cylinder portion 61a. An outer circumference surface of the cylinder portion 61a is in parallel to the axis of the roller body 61. A space between the two flange portions 61b is substantially equal to or slightly larger than a width of the sliding member 14. Thus, the outer circumference of the roller body 61 entirely contacts the sliding member 14 of the movable body 11 along the axis direction thereof. Consequently, the axis of the roller body 61 is along the direction Y which is orthogonal to both of the axis direction of the through hole 11b of the movable body 11 and the biasing direction X in which the movable body 11 is biased by the actuator main body 4 and the roller 6. The bearing portion 61c is formed to have an annular shape, and the inner diameter of the bearing portion 61c is slightly larger than the outer diameter of the roller shaft 62.

In this configuration, the roller shaft 62 is inclined as described above, and thus, the roller shaft 62 does not entirely contact the bearing portion 61c along the axis direction, but contacts one of the edges of the bearing portion 61c in the axis direction. Spring force of the coil springs 78 is transmitted to the roller body 61 via the stepped screws 77, the connecting member body 70, and the roller shaft 62. The roller shaft 62 contacts only one of the edges of the bearing portion 61c in the axis direction at all the time, and thus, the spring force of the coil springs 78 acts on one of the edges of the bearing portion 61c in the axis direction at all the time. Therefore, the spring force of the coil springs 78 can be caused to stably act on the sliding member 14 of the movable body 11. In addition, the one of the edges of the bearing portion 61c in the axis direction is located at the same position in the axis direction of the roller body 61 as a center portion of the outer circumference surface of the cylinder portion 61a in the axis direction (that is, a dimensions m1 and m2 in FIG. 31 are equal to each other). Therefore, the spring force of the coil springs 78 equally acts on the sliding member 14 of the movable body 11 in the axis direction of the roller body 61.

A space is provided between the bearing portion 61c and the roller collar 63 in the axis direction, and also, a space is provided between the bearing portion 61c and a base end portion of the roller shaft 62. Additionally, the engagement portions 73 are engaged in the notches 84a of the support body 8, but do not closely fit with the notches 84a. Specifically, some space is provided therebetween in the axis direction of the through hole 11b of the movable body 11 and the orthogonal direction. Thus, backlash of the connecting member 7 might occur according to the space, and consequently, backlash of the roller shaft 62 might occur. However, as described above, spaces are provided between the bearing portion 61c and the roller collar 63 and between the bearing portion 61c and the base end portion of the roller shaft 62, and thus, the bearing portion 61c and the roller collar 63 or the bearing portion 61c and the base end portion of the roller shaft 62 serve as a buffer to prevent interference with rotation of the roller body 61.

In the ultrasonic actuator 2 configured as described above, the actuator main body 4 is pressed against the movable body 11 by elastic force of the coil springs 78. Thus, friction force is ensured between the driver elements 3 and the movable body 11, and drive force can be efficiently transmitted from the actuator main body 4 to the movable body 11. In this state, the roller 6 is pressed by the elastic force of the coil springs 78 against the movable body 11 from an opposite side of the movable body 11 to a side thereof at which the actuator main body 4 is provided. That is, the movable body 11 is pressed from both sides by the actuator main body 4 and the roller 6. Furthermore, the pressing force in this state is generated by the coil springs 78, and the movable body 11 is pressed with equal pressing forces by the actuator main body 4 and the roller 6. Therefore, even in the configuration in which the actuator main body 4 is pressed against the movable body 11, pressing force acting on the movable body 11 is cancelled out, thereby reducing uneven force acting on the movable body 11. The movable body 11 is supported by the shaft 10, thus preventing or reducing unnecessary force acting on the shaft 10. Therefore, the movable body 11 can be smoothly moved along the shaft 10.

In the above-described configuration, as viewed in the optical direction, the connecting member 7 connecting the actuator main body 4 and the roller 6 and biasing the actuator main body 4 and the roller 6 in a direction toward the movable body 11 is not provided at the side of the movable body 11 at which the focus lens frame 152 (not including the movable body 11 in this context) is provided, but is provided at an opposite side of the movable body 11 to the side at which the focus lens frame 152 is provided. That is, as shown in FIG. 6, the connecting member 7 is configured not to overlap the focus lens frame 152, as viewed in the optical axis L direction. In other words, the position of the connecting member 7 is circumferentially shifted around the axis Z of the shaft 10 so that the connecting member 7 does not overlap the focus lens frame 152.

For example, in a configuration in which, as viewed in the optical axis L direction, the connecting member 7 and the focus lens frame 152 overlap each other, when the focus lens frame 152 is moved along the optical axis L direction, the focus lens frame 152 contacts the connecting member 7 at a certain point, and cannot be moved beyond the point. That is, the total amount of movement of the focus lens frame 152 is restricted by the connecting member 7. In addition, in another configuration in which the fifth group frame 150 is arranged in the lens barrel, when the necessary total amount of movement of the focus lens frame 152 is determined, a space in which the ultrasonic actuator 2 including the connecting member 7 can be arranged has to be ensured in the barrel, in addition to the necessary total amount of movement of the focus lens frame 152. That is, a space which is used up only for arrangement of the ultrasonic actuator 2, and in which the focus lens frame 152 cannot move is provided in the limited space of the lens barrel.

In contrast, according to this embodiment, the focus lens frame 152 does not interfere with the connecting member 7. Thus, the focus lens frame 152 can be moved along the optical axis L direction while passing at the side of the ultrasonic actuator 2. That is, the total amount of movement of the focus lens frame 152 is not restricted by the connecting member 7. Therefore, in the configuration in which the fifth group frame 150 is provided in the lens barrel, it is not necessary to provide a space only for arrangement of the ultrasonic actuator 2, and thus, it is sufficient to provide a small space in order to ensure a predetermined total amount of movement of the focus lens frame 152. Therefore, the entire size of the ultrasonic actuator 2 and the focus lens frame 152 can be reduced, and the total amount of movement of the focus lens frame 152 can be ensured.

In this embodiment, drive force is output from the driver elements 3 to the movable body 11 by friction force. That is, at least the dimension of the movable body 11 in the optical axis L direction has to be larger than the total amount of movement of the focus lens frame 152. The through hole 11b through which the focus main shaft 153 is inserted is provided in the movable body 11. That is, the movable body 11 functions as a bearing. That is, when the length of the movable body 11 is increased to ensure the total amount of movement of the focus lens frame 152, the length of the bearing of the focus lens frame 152 is increased in the axis direction. Thus, backlash between the focus lens frame 152 and the focus main shaft 153 can be reduced, and the focus lens frame 152 can be stably driven.

Furthermore, the connecting member 7 is provided at the opposite side of the movable body 11 to the side at which the focus lens frame 152 is provided. Thus, even when the ribs 11a to increase rigidity between the movable body 11 and the focus lens frame 152 are provided at the side of the movable body 11 at which the focus lens frame 152 is provided, the ribs 11a do not interfere with the movement of the focus lens frame 152. That is, when the ultrasonic actuator 2 is configured as described above, the ribs 11a can be provided between the movable body 11 and the focus lens frame 152 to improve the rigidity between the focus lens frame 152 and the movable body 11. Consequently, the focus lens frame 152 can be stably driven.

OTHER EMBODIMENTS

An embodiment may be configured as described below.

In the above-described embodiment, the member (opposite member) provided at the opposite side of the movable body 11 to the side at which the actuator main body 4 is provided is not limited to the roller 6. For example, the opposite member may be a roller in which a roller body is non-rotatably attached to a roller shaft. Also, the opposite member may be a contact member which merely contacts the movable body 11. In this case, the contact member may be provided as a separate member from the connecting member 7, or may be provided as one unit with the connecting member 7. Note that the contact member preferably has a small friction resistance with the movable body 11. Furthermore, the opposite member may be another actuator main body. In this case, the movable body 11 is sandwiched between the two actuator main bodies. That is, the movable body 11 is driven by the two actuator main bodies. Any member may be employed, as long as the member contacts the movable body 11 and is located at an opposite position to the actuator main body 4 with the movable body 11 sandwiched therebetween.

The ultrasonic actuator 2 generates the first-order mode stretching vibration and the second-order mode bending vibration in the actuator main body 4, but it is not limited to the above. As long as the stretching and bending vibrations can be generated in the actuator main body 4, an actuator main body generating any order of vibration may be employed.

Furthermore, the actuator main body 4 is configured so that the driver elements 3 are provided on the long-side surface 40c, but it is not limited thereto. For example, the actuator main body 4 may be configured so that driver elements are provided on a short-side surface 40e of the actuator main body 4. In this case, the actuator main body 4 is arranged to contact the movable body 11 so that the short-side surface 40e of the actuator main body 4 faces the movable body 11. Then, drive force is output from the actuator main body 4 in the direction of the bending vibration.

In the above-described embodiment, the movable body 11 and the focus lens frame 152 are formed as one unit, but they are not limited thereto. For example, the movable body 11 and the focus lens frame 152 may be separate members. In this case, the movable body 11 and the focus lens frame 152 may be connected together by some connecting mechanism. However, to efficiently transmit drive force from the ultrasonic actuator 2 to the focus lens frame 152, the movable body 11 and the focus lens frame 152 are preferably formed as one unit.

Furthermore, the movable body 11 is provided to the focus lens frame 152, but it is not limited thereto. That is, it is not limited to the focus lens frame 152 that is driven by the ultrasonic actuator 2, but some other lens frame may be driven by the focus lens frame 152.

Moreover, the movable body 11 does not have to be supported by the shaft 10. That is, as long as the movable body 11 is movable with a lens frame as one unit, the support structure thereof is not limited.

As described above, the technique disclosed herein is useful for drive units which includes a vibratory actuator and drives a lens frame.

The foregoing embodiments have been set forth merely for purposes of preferred examples in nature, and are not intended to limit the scope, applications, and use of the invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A drive unit, comprising:
a lens frame configured to support a lens;
a movable body arranged to be located outside the lens in a radial direction of the lens and extend along an optical axis direction, and configured to be movable with the lens frame as one unit along the optical axis direction; and
a vibratory actuator configured to drive the movable body, wherein
the vibratory actuator includes an actuator main body arranged to contact the movable body and configured to vibrate to output drive force to the movable body, an opposite member arranged at a position which is opposite to the actuator main body to contact the movable body so that the movable body is sandwiched between the actuator main body and the opposite member and kept movable along the optical axis direction, and a connecting member configured to connect the actuator main body and the opposite member together and bias the actuator main body and the opposite member in a direction toward the movable body, and
the connecting member is not provided at a side of the movable body at which the lens frame is provided, but is provided at an opposite side of the movable body to the side at which the lens frame is provided, as viewed in the optical direction.

2. The drive unit of claim 1, further comprising:
a shaft extending along the optical direction,
wherein
the movable member has a through hole, and the shaft is inserted through the through hole.

3. The drive unit of claim 1, wherein
the actuator main body and the opposite member do not overlap the lens frame, as viewed in the optical direction.

4. A drive unit, comprising:
a lens frame configured to support a lens;
a movable body arranged to be located outside the lens in a radial direction of the lens and extend along an optical axis direction, and configured to be movable with the lens frame as one unit along the optical axis direction; and
a vibratory actuator configured to drive the movable body, wherein
the vibratory actuator includes an actuator main body arranged to contact the movable body and configured to vibrate to output drive force to the movable body, an opposite member arranged at a position which is opposite to the actuator main body to contact the movable body so that the movable body is sandwiched between the actuator main body and the opposite member and kept movable along the optical axis direction, and a connecting member configured to connect the actuator main body and the opposite member together and bias the actuator main body and the opposite member in a direction toward the movable body, and
the connecting member does not overlap the lens frame, as viewed in the optical direction.

5. The drive unit of claim 4, further comprising:
a shaft extending along the optical direction,
wherein
the movable member has a through hole, and the shaft is inserted through the through hole.

6. The drive unit of claim 4, wherein
the actuator main body and the opposite member do not overlap the lens frame, as viewed in the optical direction.

* * * * *